United States Patent [19]
Stufflebeam et al.

[11] Patent Number: 5,848,571
[45] Date of Patent: *Dec. 15, 1998

[54] SEED SINGULATOR ASSEMBLY FOR A SEED METERING MECHANISM

[75] Inventors: John F. Stufflebeam, Romeoville; Thomas A. Olson, Bolingbrook; Lisle J. Dunham, Downers Grove; Stephen D. Berry, Plainfield, all of Ill.

[73] Assignee: Case Corporation, Racine, Wis.

[ * ] Notice: The term of this patent shall not extend beyond the expiration date of Pat. No. 5,839,378.

[21] Appl. No.: 700,225

[22] Filed: Aug. 20, 1996

[51] Int. Cl.$^6$ ........................................................ A01C 7/00
[52] U.S. Cl. ........................... 111/185; 111/181; 221/211; 221/278
[58] Field of Search ..................... 111/185, 170, 111/174, 177, 178, 179, 181, 184; 221/211, 278, 277, 203

[56] References Cited

U.S. PATENT DOCUMENTS

| | | |
|---|---|---|
| 2,723,742 | 11/1955 | Marshall .................................. 221/203 |
| 3,596,615 | 8/1971 | Fisher ......................................... 111/76 |
| 3,659,746 | 5/1972 | Winslow ............................... 111/78 X |
| 3,796,346 | 3/1974 | Ribouleau .............................. 221/211 |
| 3,990,606 | 11/1976 | Gugenhan ............................... 221/211 |
| 4,029,235 | 6/1977 | Grataloup . |
| 4,047,638 | 9/1977 | Harrer et al. . |
| 4,074,830 | 2/1978 | Adams et al. . |
| 4,091,964 | 5/1978 | Harrer . |
| 4,148,414 | 4/1979 | Parks, Jr. ................................ 221/278 |
| 4,241,849 | 12/1980 | Harrer . |
| 4,363,423 | 12/1982 | Larsen ................................ 221/277 X |
| 4,399,757 | 8/1983 | Maury . |
| 4,449,642 | 5/1984 | Dooley .................................... 221/211 |
| 4,450,979 | 5/1984 | Deckler . |
| 4,469,244 | 9/1984 | Maury . |
| 4,511,061 | 4/1985 | Gaspardo ............................ 221/211 X |
| 4,515,291 | 5/1985 | Holmes . |
| 4,533,066 | 8/1985 | Holmes et al. . |
| 4,600,122 | 7/1986 | Lundie et al. . |
| 4,601,372 | 7/1986 | Swales et al. . |
| 4,613,056 | 9/1986 | Olson . |
| 4,646,939 | 3/1987 | Herriau . |
| 4,664,290 | 5/1987 | Martin et al. . |
| 4,688,698 | 8/1987 | Holland ................................... 221/211 |
| 4,718,574 | 1/1988 | Schoenmaekers . |
| 4,793,511 | 12/1988 | Ankum et al. . |
| 4,799,291 | 1/1989 | Ankum et al. . |
| 4,836,412 | 6/1989 | Webber et al. . |
| 4,898,108 | 2/1990 | McDermott . |
| 4,924,786 | 5/1990 | Keeton ............................... 221/277 X |
| 4,928,607 | 5/1990 | Luigi ................................... 221/211 X |

(List continued on next page.)

FOREIGN PATENT DOCUMENTS

| | | |
|---|---|---|
| 0037775 B1 | 10/1981 | European Pat. Off. . |
| 0140701A2 | 5/1985 | European Pat. Off. . |
| 0141638 A2 | 5/1985 | European Pat. Off. . |
| 0155688 A2 | 9/1985 | European Pat. Off. . |
| 0338883 A1 | 10/1989 | European Pat. Off. . |
| 1931362 | 5/1970 | Germany .............................. 111/185 |
| 7503866 | 10/1975 | Netherlands ......................... 111/185 |

Primary Examiner—Thomas B. Will
Assistant Examiner—Victor Batson
Attorney, Agent, or Firm—Richard A. Speer; Mayer Brown & Platt

[57] ABSTRACT

A seed metering mechanism including a seed singulator assembly for reducing the likelihood of or eliminating double or excess seeds being carried by a seed disc of the seed metering mechanism to a discharge area of the seed metering mechanism for deposit to the ground. The singulator assembly is disposed downstream of a seed chamber and upstream of the seed discharge area of a seed metering mechanism. The seed singulator of the present invention includes a seed engaging member arranged on opposite sides of the path of travel of a circular array of openings on a seed disc of the seed metering mechanism. The spacings between the seed engaging members being such that only a single seed carried in each opening is permitted to pass therebetween.

90 Claims, 19 Drawing Sheets

U.S. PATENT DOCUMENTS

| | | |
|---|---|---|
| 4,949,869 | 8/1990 | Ribouleau . |
| 5,058,766 | 10/1991 | Decker . |
| 5,082,126 | 1/1992 | Ribouleau . |
| 5,143,002 | 9/1992 | Gaspardo ................................ 111/185 |
| 5,170,909 | 12/1992 | Lundie et al. . |
| 5,325,800 | 7/1994 | Wisor et al. . |
| 5,325,801 | 7/1994 | Fiorido . |
| 5,392,707 | 2/1995 | Romans ................................. 111/185 |
| 5,501,366 | 3/1996 | Fiorido ................................. 221/211 |
| 5,535,689 | 7/1996 | Anderson et al. ................. 111/185 X |
| 5,535,917 | 7/1996 | Ribouleau ............................. 221/211 |
| 5,542,364 | 8/1996 | Romans ................................. 111/185 |

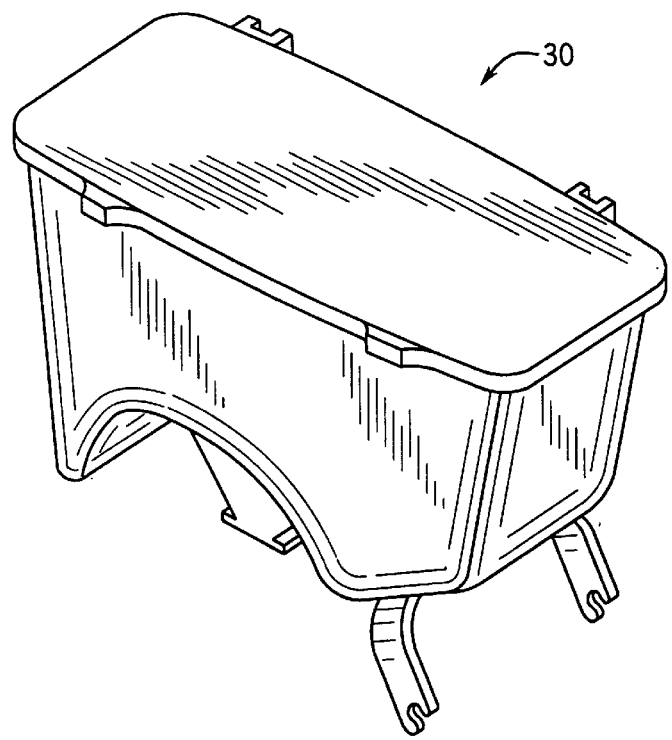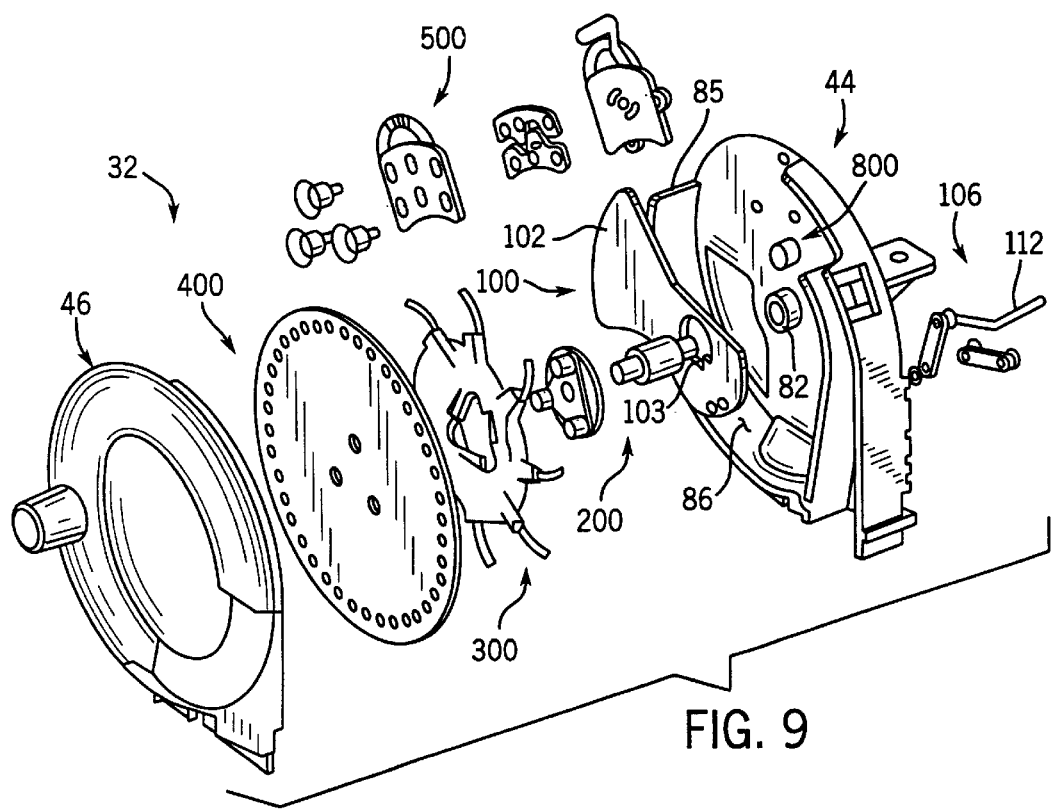
FIG. 9

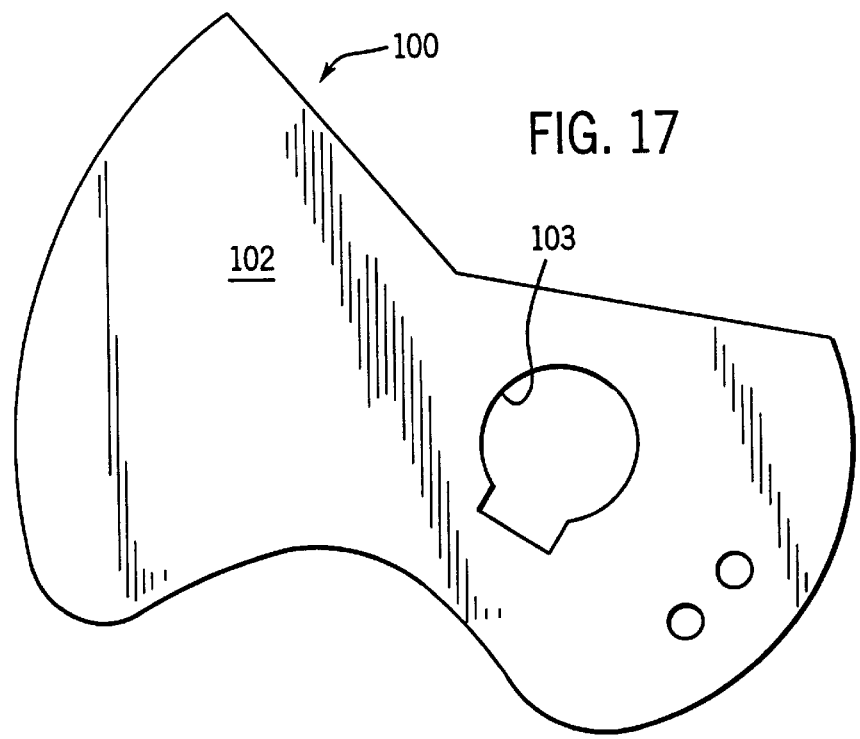
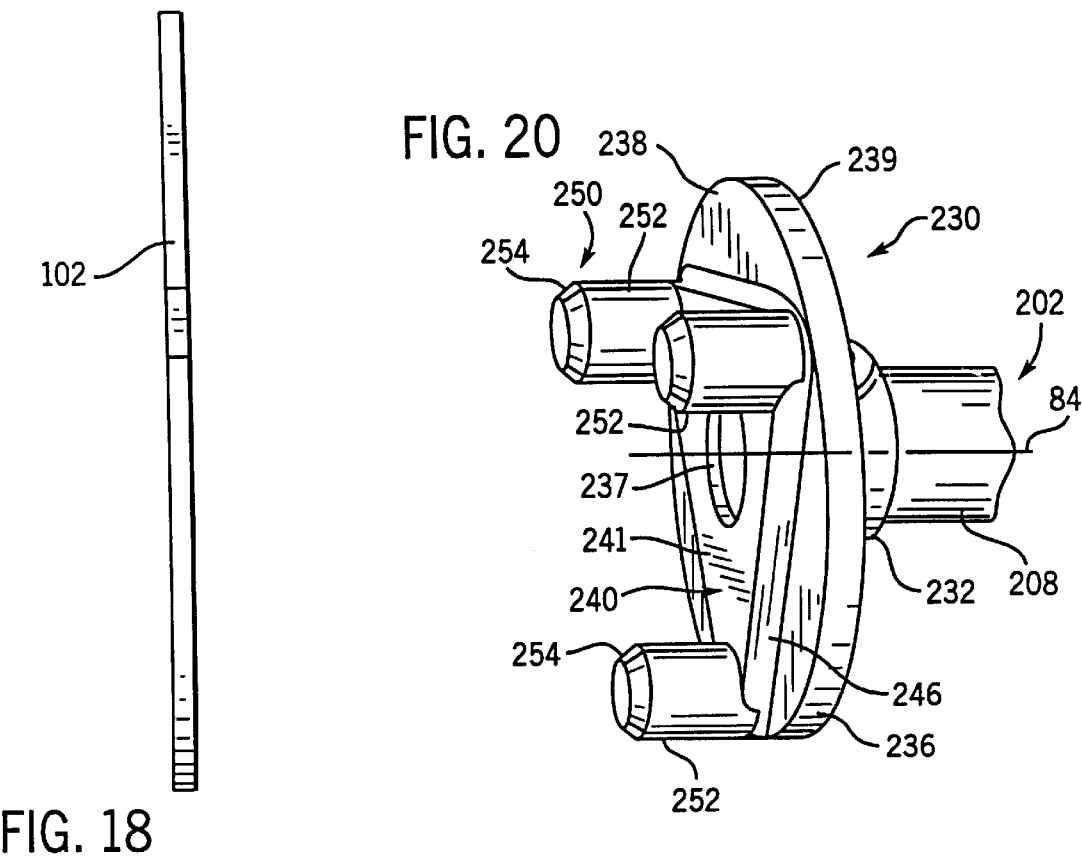

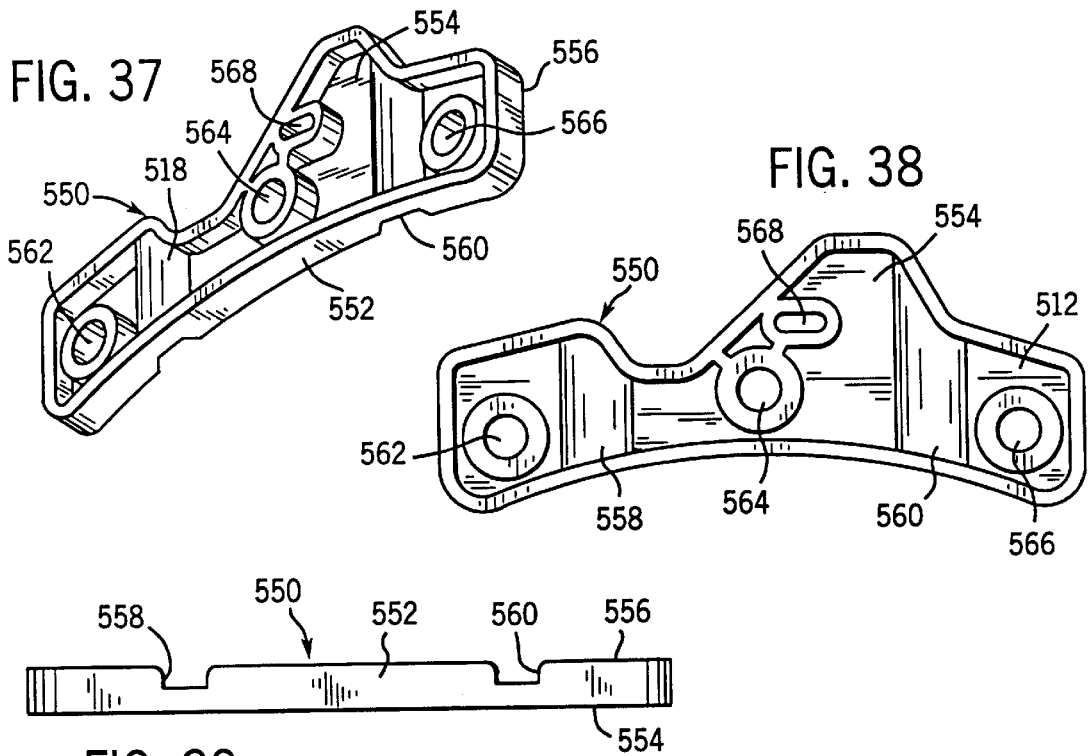
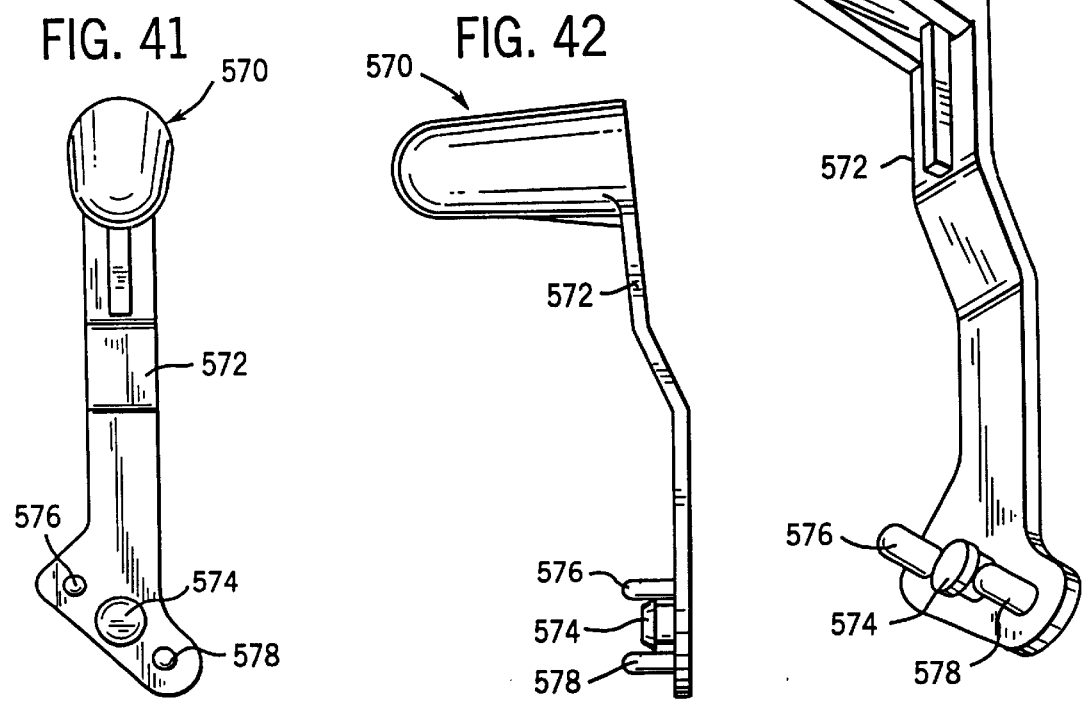

SEED SINGULATOR ASSEMBLY FOR A SEED METERING MECHANISM

FIELD OF THE INVENTION

The present invention generally relates to seed metering mechanisms and, more particularly, to a seed singulator assembly for a seed metering mechanism.

BACKGROUND OF THE INVENTION

Seed meters of various designs have been used for sometime to dispense seeds at a controlled rate into a seed furrow as the seed meter is advanced above and along the seed furrow. In a typical arrangement, a tractor is coupled to tow a tool bar to which are attached in a generally parallel, spaced apart relation a plurality of planting units with seed meter arrangement attached thereto. Each of the planting units typically includes a seed hopper for containing and carrying a large quantity of seeds to be planted or a smaller container fed from a centralized bin or large hopper, a device for opening a furrow in the ground as the tractor drawn tool bar is advanced across the field over the ground, a seed meter is coupled to the seed hopper for dispensing individual seeds into the furrow at a controlled rate, and a further device for moving soil at the sides of the furrow to close the furrow over the seeds.

During a planting operation, the tractor typically moves across the field at speeds of about 4 to about 8 miles per hour. The spacing between adjacent individual seeds in each furrow can be as little as 0.5 inches or less or as much as 10 inches or more depending upon the particular seed being planted. The seed metering mechanism therefor must be capable of dispensing seeds at various rates in the order of 15 to 130 seeds per second or greater as well as at rates which are considerably less.

The many different types of seeds to be planted using a seed metering mechanism include corn, cotton, sorghum, sugar beets, soy, beans and sunflowers to name a few. As will be appreciated, such seeds vary considerably in size, weight and shape. For example, peanut and edible bean seeds are among the largest seeds for planting and have elongated irregular shapes and outer surfaces. Soybean, and pelletized seeds are smaller and tend to be rounder and vary in shape and size. Sorghum and raw sugar beet seeds have a rounder almost spherical appearance. Sorghum seeds have a relatively smooth outer surface. On the other hand, raw sugar beet seeds have a very rough and irregular outer surface configuration. Cotton seed is small and shaped like some corn seed. On the other hand, corn seeds have a somewhat triangular shape with generally flat sides.

Despite these numerous differences in the size, shape and surfaces of such seeds, seed meters are expected and are required to handle all different types of seeds described above plus many more while requiring minimum effort regarding part changes and adjustments. At the same time, required spacing and depth standards of planting accuracy typically mandate a low error rate. A missed seed or doubling of seeds is undesirable and may be tolerated only very infrequently. Such requirements place considerable demands upon the accuracy of the seed metering mechanisms.

Some seed metering mechanisms used in planting operations of the type discussed above are of the mechanical type and include a vertical or horizontal seed plate or disc with mechanically actuated fingers or similarly operated mechanical devices for separating individual seeds from the seed disc and then dispense them into the furrow. While some mechanical seed meters are satisfactory for certain applications, they typically suffer from a number of limitations including the limited speed at which they can accurately dispense seeds, and inability to handle different type seeds without making cumbersome and extensive part changes, and an inherent design complexity which may typically add to the cost, wear and maintenance problems of the mechanically operated seed dispensing mechanisms.

Alternatively, a seed metering mechanism which utilizes an air pressure differential has been developed in an effort to overcome some of the problems of the mechanical seed meters. Air pressure differential seed meters, which are commonly known as air seed meters, are generally of two types. The first type being the positive pressure type and the second type relying upon negative pressure or vacuum.

In the positive pressure type of air seed metering mechanism, air is blown into the seed chamber and onto the surface of a rotating or otherwise movable and apertured member or disc in order to create the higher than atmospheric pressure in the chamber. This forces seeds from a seed mass onto the seed member or disc where they are retained for later release. The apertures or holes in the rotating member or disc are open to atmosphere where the individual seeds are held by the blowing air until the seeds are dispensed by interrupting the flow of air to the seeds.

While air seed meters of the positive pressure type offer certain advantages over mechanical seed meters, they have certain limitations of their own which may prove to be a significant disadvantage for various seeding applications. In an effort to fill each hole or opening with a seed as the seed disc rotates through the seed mass, a relatively high pressure differential is applied to the disc. Because the seeds are held in place on the rotating disc or other movable member by differential pressure resulting from positive pressure in the chamber, it is usually necessary that the air flow be directed through the seed mass to aid in the depositing of individual seeds onto the disc. The air flow has been found to interfere with the orderly delivery of seeds from the disc and, ultimately, to the ground. Even a very high pressure differential does not assure the avoidance of seed doubles or voids/skips at the various apertures in the disc. In positive pressure seed metering mechanisms, the seed hopper must be sealed to maintain pressure in the system. If for any reason the hopper lid comes off or the hopper otherwise becomes unsealed, the seed meter will not properly function.

Vacuum seed meters have been found to overcome some of the problems in the positive pressure seed meters and offer more control over the seed being transported by the seed disc. In vacuum seed meters, a vacuum source is typically coupled to a separate chamber on the opposite side of the seed disc from the seed mass with the vacuum communicating through the apertures in the seed disc to the seed mass. The vacuum is of sufficient magnitude such that it tends to draw seeds into the openings defined by the disc and hold the seeds thereto as the seeds are moved through the seed disc under the influence of the moving seed disc toward the seed discharge area of the seed metering mechanism. The openings between the outer surface of the seeds and the periphery of the openings in the disc allows air to pass therethrough thereby maintaining the seeds in operable association with the disc. Because the pressure differential at the seed disc comes from a vacuum source on the opposite side thereof and not from the flow of air at the same side thereof as with positive pressure type seed metering mechanisms, the problem of having to direct an air flow through the seed mass and on to the seed disc are eliminated.

Despite the various advantages of vacuum seed meters, over seed meters of the positive pressure type, presently known vacuum seed meters are not without problems of their own. A farmer desires to reduce the amount of time required to complete a planting operation so as to not miss the weather window of opportunity that may be presented. Accordingly, the speed of the rotating discs on the seed planters have increased and demand for better row seed spacing has risen as well. Moreover, the farmer typically wants to use common seed discs for planting more than one type of seed whenever possible, thus, reducing the costs for the planting unit while planting or depositing one and only one seed to the ground with an exact distance separating adjacent seeds.

To maintain the higher planting speeds, a relatively high power vacuum source is typically used to provide a sufficient pressure differential needed to accelerate the seeds to the speed of the rotating disc and thereafter hold the seeds to the openings provided on the disc. Because the seeds are drawn toward the openings under the influence of suction, excess seeds are often present in one opening on the seed disc. The multiple seeds are often conjointly carried in the one opening to the discharge area causing two or more seeds to be planted when only one seed may be desired. Also, if the seed plate selected for use in the planting operation has openings that are too large for the seeds to be planted, there most likely will be seed doubles or even triples that are deposited into the furrow. Moreover, testing has revealed that consistent orientation of the seed relative to the openings is relatively important to achieve substantially identical drop trajectories for the seeds thus achieving substantially uniform plantings.

Thus, there is a need and a desire for a seed metering mechanism including a common disc that carries and drops only a single seed therefrom thus maintaining control over seed count or population per acre as required by the farmer. In this regard, there is a need and a desire for a seed metering mechanism including a seed singulator apparatus for eliminating the multiples of seeds over each opening of the seed metering disc and that is readily usable in combination with a seed metering mechanism.

SUMMARY OF THE INVENTION

In view of the above, and in accordance with the present invention, there is provided a seed metering mechanism including a seed singulator assembly for reducing the likelihood of or eliminating double or excess seeds being carried by a seed disc of the seed metering mechanism to a discharge area of the seed metering mechanism for deposit to the ground. In a preferred form, the seed metering mechanism comprises a housing assembly defining a seed chamber wherein seeds are stored and a vacuum chamber. In a discharge area of the housing assembly the effectiveness of the vacuum chamber is eliminated thus allowing the seeds to gravitationally fall from the seed disc. The seed disc has two opposed flat or planar sides, one facing the seed chamber and the other facing the vacuum chamber. The seed disc is mounted for rotation about a fixed axis and defines a circular array of openings or holes extending through the disc. Because the disc rotates about a fixed axis, the openings or holes in the disc traverse a predetermined path of travel or movement during operation of the seed metering mechanism. As is conventional, the seeds are carried by the disc to the discharge area of the seed metering mechanism under the influence of pressure differentials. The singulator assembly is disposed downstream of the seed chamber and upstream of the seed discharge area of the seed metering mechanism. The seed singulator of the present invention includes a plurality of seed engaging members arranged on opposite sides of the path of travel of the openings. The spacings between the seed engaging members is such that only a single seed to be carried with each opening is permitted to pass therebetween.

Each seed engaging member of the singulator assembly includes a seed engaging portion projecting outwardly from one end thereof. The seed engaging portion of the seed engaging member is preferably configured depending upon the particular seed being planted. Preferably, each seed engaging member is mounted for rotation about an axis extending generally perpendicular to the sides of the seed disc. In the illustrated form of the invention, each seed engaging member is telescopingly mounted about an elongated hub defining the axis of rotation of the seed engaging member. In a most preferred form of the invention, the seed engaging member and the respective hub define cooperating instrumentalities therebetween for releasably fixing the seed engaging member relative to the axis of rotation thereof. Moreover, each seed engaging member is preferably biased toward a predetermined relationship with the flat side or face of the seed disc.

In a most preferred form of the invention, each seed engaging member has a seed engaging portion that is disposed adjacent the seed chamber side of the seed disc and has an inclined seed engaging surface configuration. The seed engaging surface configuration of the each seed engaging member is specifically designed to lift and move multiples of seeds assembled to a single hole away from the disc such that gravitationally fall and return to the seed reservoir of the seed metering mechanism. The seed engaging surface configuration of each seed engaging member allows multiples of seeds to be gently separated from the disc. Moreover, each seed engaging member is preferably adjustable about its rotational axis and includes structure for holding the seed engaging surface portion thereof in releasably fixed relation relative to said axis of rotation.

In one form of the invention, each seed engaging member has a generally tubular-like configuration with a frusto-conically shaped seed engaging portion provided adjacent one end thereof. The seed engaging portion is preferably resiliently urged toward the side of the seed disc under the influence of a spring. The frusto-conical shape of the seed engaging portion of each seed engaging member preferably has a changing surface configuration extending thereabout. That is, one portion of the seed engaging portion of the seed engaging member forms an included angle of about 50° relative to the flat side surface of the seed disc. Another segment of the seed engaging portion of the seed engaging member forms an included angle of about 65° relative to the same flat side surface of the seed disc. In between, the seed engaging surface smoothly changes between about the 50° included angle and the 65° included angle.

In another form of the present invention, the seed engaging portion of each seed engaging member has a slanted surface terminating in an outboard edge. Notably, the outboard edge has an asymmetrical like configuration extending about the circumference thereof. Accordingly, as the seed engaging member is rotated about its axis, the clearance between the outboard edge of the seed engaging member and the fixed path of travel of the openings changes. Accordingly, the space permitted for the seed to pass through can be adjusted, as required, simply by rotation the seed engaging member about its own axis.

In still another form of the present invention, the axis of the seed engaging member is arranged eccentric relative to the outboard edge of the seed engaging member.

Accordingly, rotation of the seed engaging member about its axis will increase or decrease the amount of space provided between the seed engaging surface and the fixed path of travel of the openings thereby controlling the seed clearance as the seed moves between the seed chamber and toward the discharge area of the seed metering mechanism.

To facilitate proper adjustment of the seed singulator assembly, each seed engaging member is preferably provided with a locator mark thereon. Depending upon the position of the locator mark relative to the axis or rotation, the operator can quickly and easily visualize the clearance setting of a particular seed engaging member.

The seed singulator assembly is preferably configured as a modular assembly that is adapted to be fitted to the housing assembly of the seed metering mechanism. The modular form of seed singulator assembly includes a housing assembly, the pair of seed engaging members, and an apparatus for adjusting the disposition of the seed engaging members relative to the fixed path of travel of the seeds. The housing assembly is quickly and easily attachable to the housing of the seed metering mechanism downstream of the seed chamber and upstream of the seed discharge area of the seed metering mechanism.

In a preferred form of the invention, the modular seed singulator assembly further includes a pair of brackets that are arranged on opposite sides of the path of travel of the openings. The brackets are slidably mounted on a base forming part of the housing assembly of the seed singulator assembly. Each bracket is configured to mount two or more seed engaging members thereon about a common line of center. As such, two seed engaging members can be mounted to one side of the fixed path of travel of the openings while a third seed engaging member can be mounted to an opposite side of the fixed path of travel of the openings thereby enhancing the elimination of double seeds from the openings in the discs. The brackets preferably include cooperating instrumentalities thereon for effecting linear guidance of the brackets relative to each other.

The apparatus for adjusting the disposition of the seed engaging members relative to the path of travel of the openings in the disc preferably comprises a cam operated mechanism carried by the base of the housing assembly for simultaneously adjusting the position of the seed engaging members relative to each other and relative to the path of travel of the openings. In a most preferred form of the invention, the adjustment apparatus includes a manually operated lever supported for rotation by the base of the housing assembly and including two actuators for positively and simultaneously adjusting the positions of the seed engaging members relative to each other and relative to the fixed path of travel of the openings. Moreover, the housing assembly preferably includes markings thereon for visually indicating the setting of the seed engaging members relative to the path of travel of the openings in the seed disc as a function of the position of the lever relative to the markings and places the seed engaging members in an optimum location relative to the path of the openings in the disc.

With the present invention there is provided a seed singulator assembly for eliminating double seeds in the openings on the seed disc thereby enhanced the likelihood that only one seed will be gravitationally deposited from each opening on the disc. Moreover, the seed singulator assembly of the present invention properly orients the seeds on the disc to effect a uniform trajectory path of gravitational travel of the seeds as they fall from the disc. Numerous adjustments are provided with the seed singulator assembly of the present invention thereby allowing common discs to be used for more than one seed type, thus, reducing the amount of downtime for the planter unit as the farmer changes seed discs.

These and numerous other objects, aims, and advantages of the present invention will become readily apparent from the following detailed description of the present invention, the appended claims, and the following drawings.

These and other objects, aims and advantages of the present invention will become readily apparent from the following detailed description, the drawings, and the appended claims.

DETAILED DESCRIPTION OF THE DRAWINGS

FIG. 9 is an exploded perspective view of the seed metering mechanism of the present invention;

FIG. 17 is a right side view of a baffle used in combination with the housing of the present invention;

FIG. 18 is an end view of the baffle illustrated in FIG. 17;

FIG. 19 is a perspective view of a driven hub forming part of the seed metering mechanism of the present invention;

FIG. 20 is a perspective view of a drive hub forming part of a drive assembly of the seed metering mechanism of the present invention;

FIG. 37 is a perspective view of another singulator mount forming part of the singulator apparatus shown in FIGS. 29 and 30;

FIG. 38 is a right side view of the singulator mount shown in FIG. 37;

FIG. 39 is a top plan view of the singulator mount shown in FIG. 38;

FIG. 40 is a perspective view of an actuator for the singulator apparatus;

FIG. 41 is a right side view of the actuator shown in FIG. 40;

FIG. 42 is an end view of the actuator shown in FIG. 40;

DETAILED DESCRIPTION OF THE INVENTION

Figure 1:
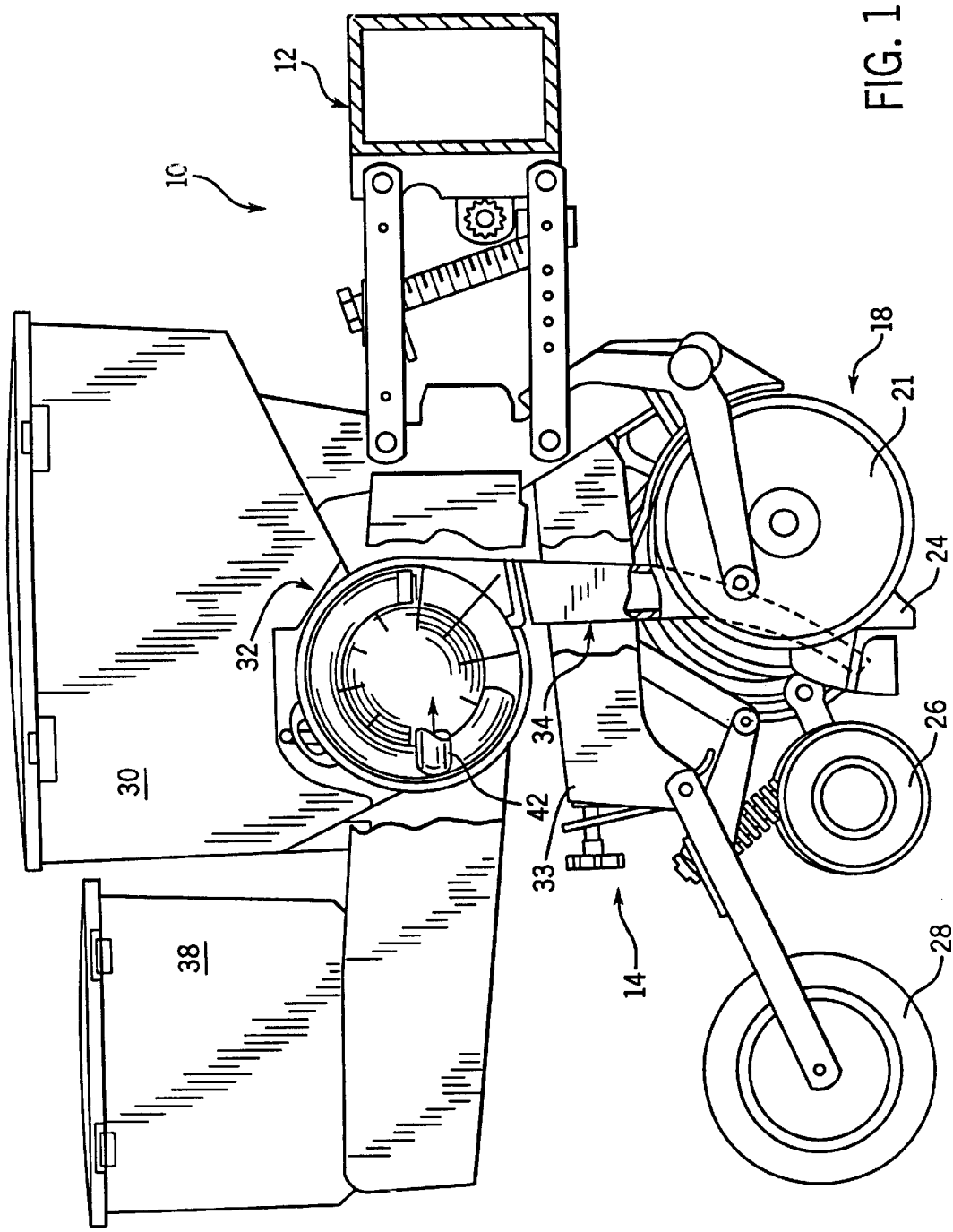
FIG. 1 is a schematic right side elevational view of a planting unit with a seed metering mechanism in accordance with the present invention mounted thereon.

While the present invention is susceptible of embodiment in different forms, there is shown in the drawings and will hereinafter be described a preferred embodiment of the invention with the understanding that the present disclosure is to be considered as setting forth an exemplification of the present invention which is not intended to limit the invention to the specific embodiment illustrated.

Referring now to the drawings, wherein like reference numerals indicate like parts throughout the several views, an agricultural implement is schematically illustrated in FIG. 1 and is represented in its entirety by reference numeral 10. Implement 10 includes an elongated tool bar 12 which is supported for movement across and over fields by a plurality of wheels (not shown) and which is adapted to be towed in a given forward direction by a power source such as an off-highway tractor or the like. Attached to the tool bar 12 are a plurality of planting units 14; with only one being illustrated and described in detail and from which a complete understanding of the present invention may be readily determined. As is well known in the art, the planting units 14 are mounted in side-by-side relation relative to each other along the length of the tool bar 12.

In the illustrated embodiment, each planting unit 14 preferably includes a conventional furrow opening apparatus generally indicated in FIG. 1 by reference numeral 18. As is known in the art, the furrow opening unit 18 preferably includes a pair of lateral spaced furrow opener discs 21, a furrow forming point, and an opener shoe 24. Alternatively, and without detracting or departing from the spirit and scope of the present invention, the planting unit 14 can be provided with a runner opener type for providing a furrow in the ground. The planting unit 14 further includes a pair of furrow closer discs 26 and a press wheel 28 arranged in fore-and-at relationship relative to each other.

A seed hopper 30 is likewise carried on each planting unit 14. The purpose of the seed hopper 30 is to provide storage for seed material that is to be gravitationally deposited to the ground as the planting unit moves over and across the field. It will be appreciated that a hopper container, smaller than that exemplified in the drawings, and connected to a centralized bin or large hopper would equally suffice without detracting or departing from the spirit and scope of the present invention. In the illustrated embodiment, a seed metering mechanism or apparatus 32 is arranged in seed receiving relation relative to the hopper 30 and, in the illustrated embodiment, forms part of the planting unit 14. The purpose of the seed metering apparatus or mechanism 32 is to uniformly release seeds received from the seed hopper 30 for deposit onto the ground. To facilitate delivery of seeds from the seed metering mechanism 32 to the ground, a vertically disposed seed tube 34 is mounted on the planting unit 14. The seed tube 34 is preferably of the type disclosed in co-pending and co-assigned patent application Ser. No. 08/581,444, filed Dec. 29, 1995, in the illustrated embodiment, the full disclosure of which is incorporated herein by reference. Suffice it to say, the seed tube 34 defines a vertical passage 36 through which seeds are delivered to the ground.

As the power source or tractor pulls the tool bar 12 across and over the ground, the furrow opening apparatus 18 operates to open a furrow in the ground. Seeds from the hopper 30 flow into the seed metering mechanism 32 from whence seeds are introduced at a controlled rate into the seed tube 34 to uniformly move through the vertical passage 36 defined by tube 34 and are, ultimately, deposited onto the ground. The furrow closer 26 trails the furrow opening apparatus 18 and, as the implement 10 is drawn across the field, serves to close the furrow together and over the seed dispensed by the seed metering mechanism 32 into the furrow. The trailing press wheel 28 serves to compact the soil closed over the seeds.

In the illustrated embodiment, a pesticide hopper 38 is mounted toward a rear end of each planting unit 14. Hopper 38 preferably includes an insecticide and is provided with conventional dispensing means for applying controlled amounts of insecticide where desired in connection with the planting of seeds by each planting unit 14.

Figure 2:
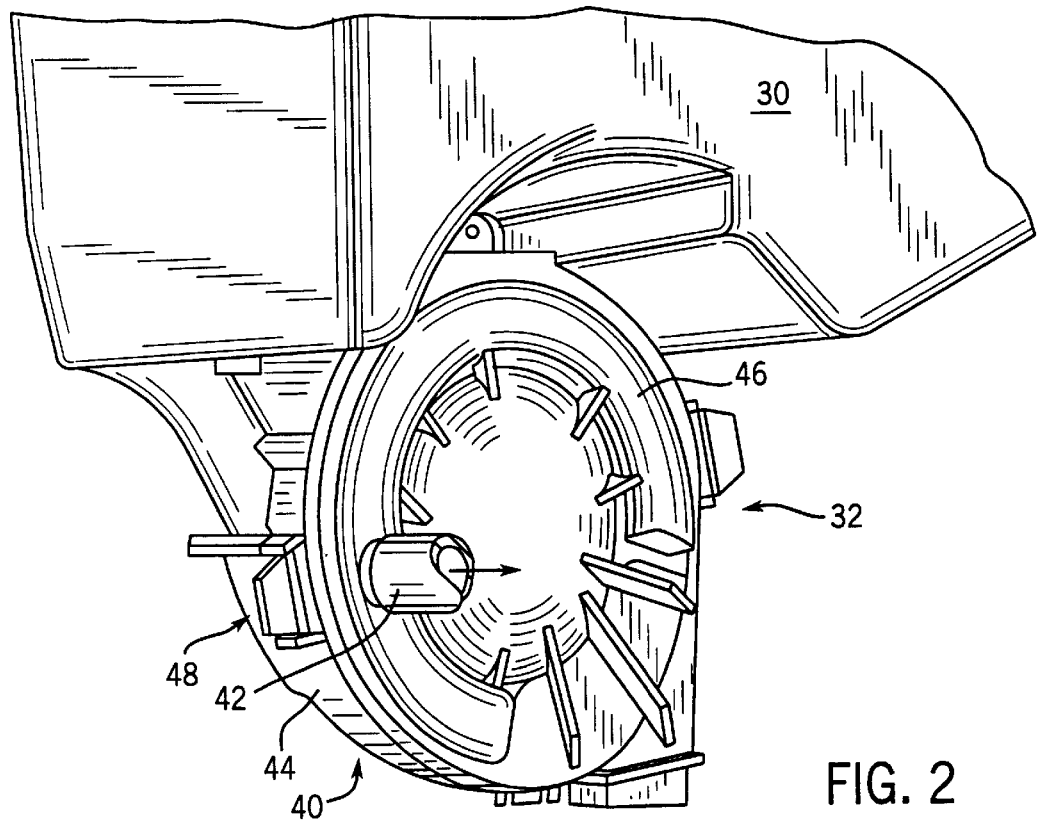
FIG. 2 is a rear perspective view looking forwardly of a seed hopper with a seed metering mechanism according to the present invention mounted thereon.
Figure 3:
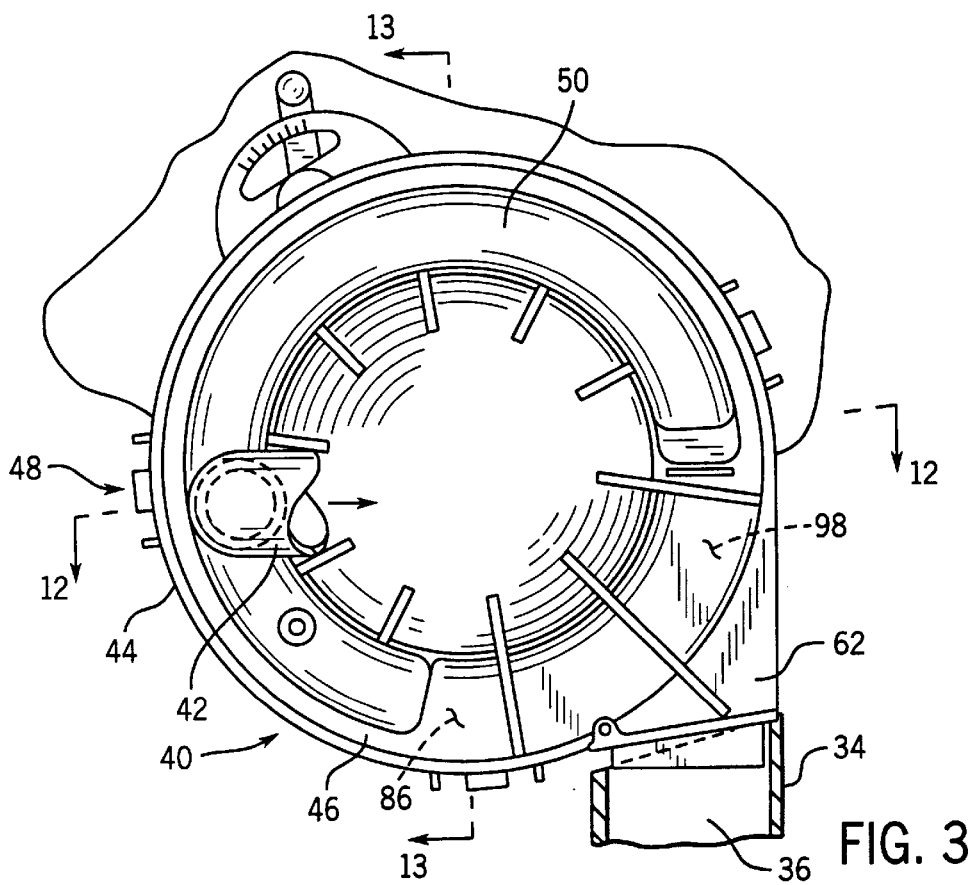
FIG. 3 is an enlarged right side elevational view of the seed metering mechanism with a fragmentary portion of a seed tube shown connected thereto.
Figure 4:
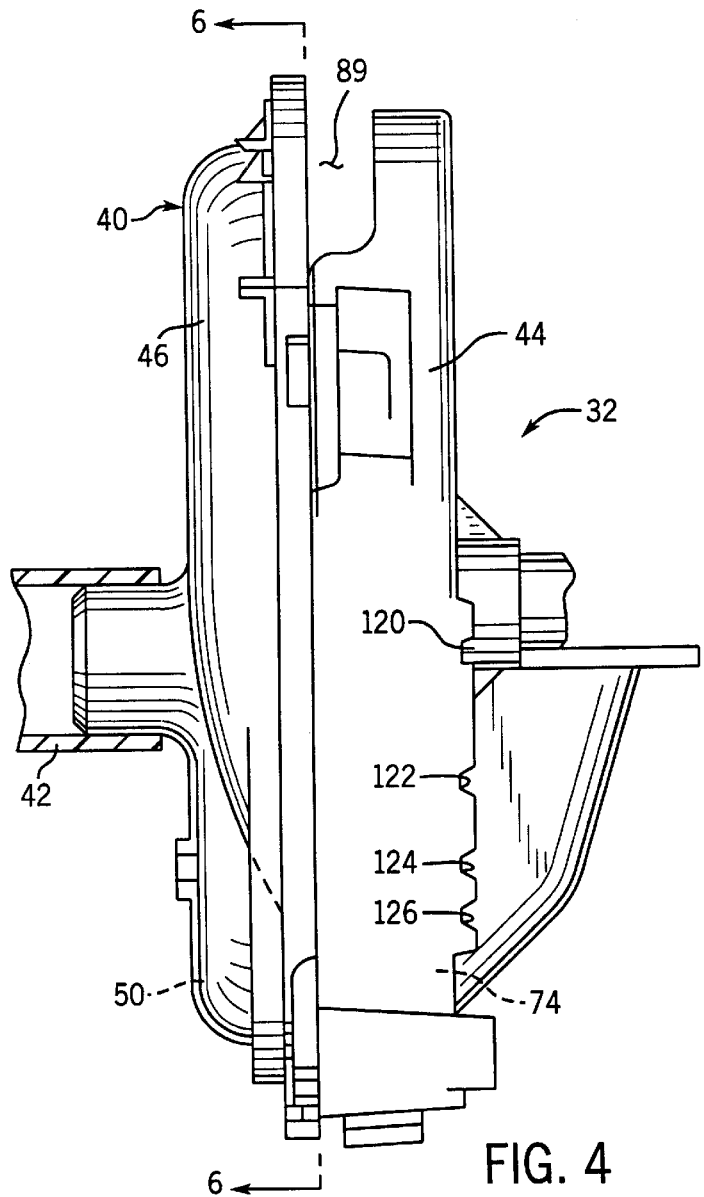
FIG. 4 is a front elevational view of the seed metering mechanism of the present invention disassembled from the seed hopper.

According to the present invention, the vacuum seed metering mechanism or apparatus 32 is mounted to and movable with the hopper 30 relative to frame structure 33 (FIG. 1) of the seed planting unit 14 and relative to the seed tube 34. Moreover, the hopper 30 is mounted on and removable from the planting unit 14 in a conventional manner. As shown in FIG. 2, the seed metering mechanism 32 includes a split housing assembly 40 arranged toward the bottom of and in seed receiving relation relative to the seed hopper 30. The seed metering apparatus 32 mounted to each planting unit 14 (FIG. 1) is individually connected via a suitable flexible conduit 42 to a common vacuum source (not shown) suitably mounted for movement over and across the field.

As shown in FIGS. 2 through 5, the housing assembly 40 of the seed metering mechanism 32 has a generally cylindrical-like configuration measuring about 300 mm. in diameter. The housing assembly 40 is comprised of a housing or shell 44 that is rigidly secured to the seed hopper 30 and a cover or shell 46 releasably connected to shell 44. In the preferred form of the invention, the cover 46 is completely removable from the housing 44 when access to the interior of the seed metering mechanism 32 is desired or required. Preferably, a series of manually releasable fasteners 48 are equidistantly arranged about the periphery of the housing assembly 40 for releasably fastening the housing 44 and cover 46 in operable and substantially air tight relation relative to each other. In the illustrated embodiment, three fasteners 48 are provided for releasably securing the cover 46 to the housing 44.

Figure 6:
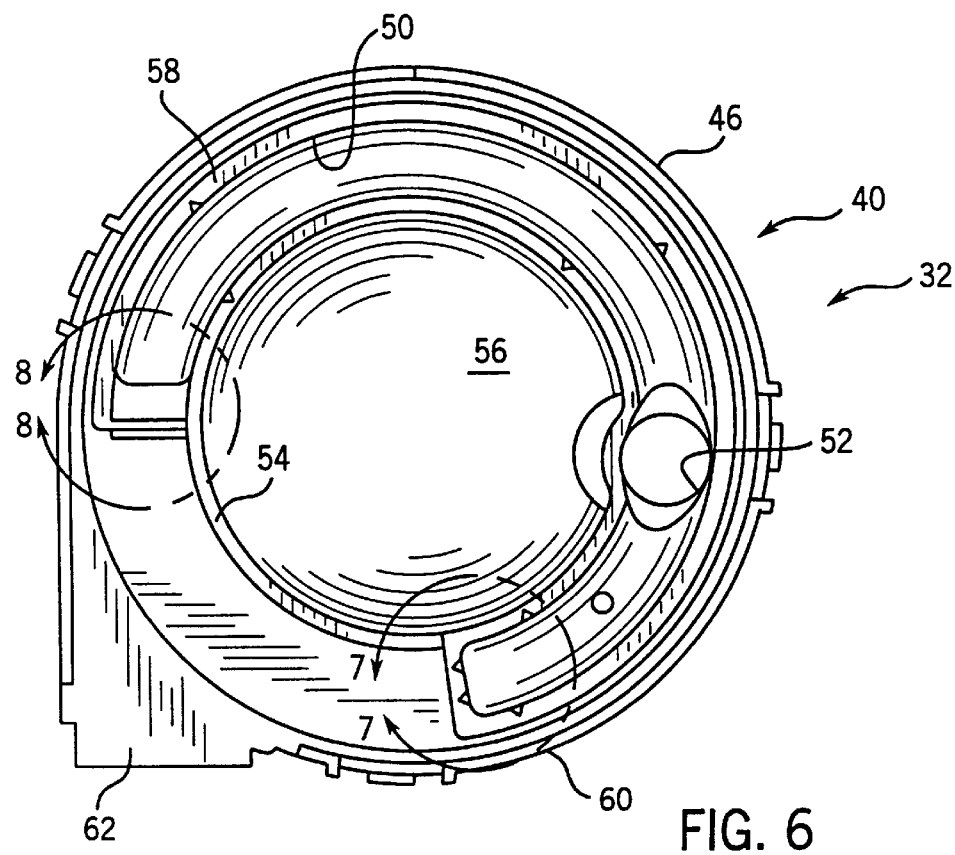
FIG. 6 is a sectional view taken along line 6—6 of FIG. 4.

The cover 46 of the split housing assembly 40 is preferably formed as a unitary or one-piece member that is formed with sealing surfaces and suitable cutoffs as an integral part thereof. As such, the seed metering mechanism of the present invention does not require additional parts to be added thereto to effect sealing such as rubber seals and the like. In the illustrated embodiment, the cover 46 is formed of a rigid nylon or thermoplastic material containing conventional antistat and/or other low friction agents such that no graphite, talc, or slick additives need to be used in combination with the seed metering mechanism of the present invention during operation thereof. Moreover, and as shown in FIG. 6, cover 46 of the split housing assembly 40 has an arcuate shaped chamber 50 extending about 270° and adjacent the periphery of the cover 46. As will be described in detail hereinafter, an exhaust or suction port 52 opens to the chamber 50 intermediate opposite ends thereof. As is conventional, the flexible conduit 42 is exteriorly connected to the exhaust port 52 such that a vacuum or negative pressure may be created in the chamber 50 when the cover 46 is fastened to the housing 44..

Chamber 50 in housing 46 is partially defined by a first annular or circular flat sealing face 54 formed integral with an inner surface 56 of the cover 46. Also arranged on the inner surface 56 of cover 46, in radially spaced congruent relation from the sealing face 54, is a second sealing face 58 that is likewise formed integral with the inner surface 56 of cover 46. Notably, the sealing faces 54 and 58 are arranged in generally planar relation relative to each other are formed integral with the cover 46 thus eliminating the need or requirement for additional separate rubber seals. Moreover, and as shown in FIG. 6, outwardly spaced from the sealing face 58, cover 46 defines a flat circular lip area 60 extending radially outwardly to the periphery of the cover 46. Notably, both the first and second seating faces 54 and 58 axially project from the inner surface 56 of the cover 44 beyond the circular lip area 60. Cover 46 furthermore defines a leg portion 62 that is generally coplanar with the flat lip area 60 and which extends tangentially away from one end of chamber 50.

Figure 7:
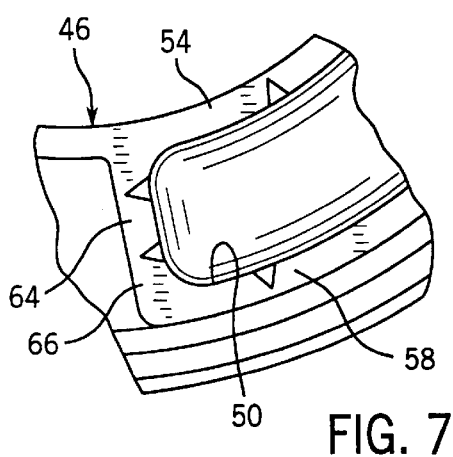
FIG. 7 is an enlarged fragmentary view of the portion encircled by line 7—7 in FIG. 6.

As shown in FIG. 7, the inner and outer radially spaced sealing faces 54 and 58, respectively, are joined, at one end, by a first radial web 64 that separates a leading end of vacuum chamber 50 from a seed discharge area of the seed metering mechanism 32 as will be discussed in detail below. In the illustrated form of the invention, the radial web 64 is preferably formed integrally with the cover 46 and has a flat sealing face 66 that is generally coplanar with the sealing faces 54 and 58 of cover 46.

Figure 8:
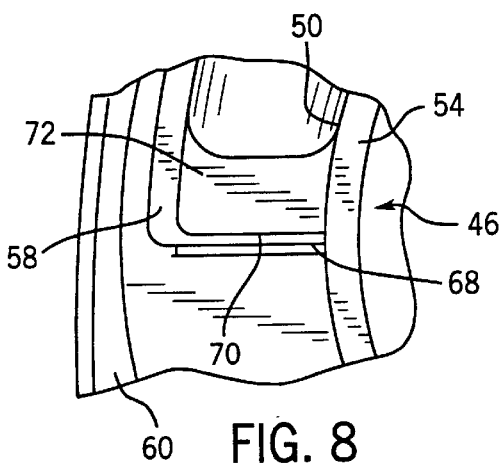
FIG. 8 is an enlarged fragmentary view of the portion encircled by line 8—8 in FIG. 6.

As shown in FIG. 8, the opposite or trailing end of chamber 50 is defined by a second radial web 68 and elongate slot 69 defining a vacuum cutoff for the chamber 50. As shown, the radial web 68 is preferably formed integral with the cover 46 and likewise has a flat sealing face 70 formed planar with the sealing faces 54 and 58 of cover 46. Notably, cover 46 further defines an inclined ramp 72 radially extending through the chamber 50 and toward the vacuum cutoff 68 and elongate slot 69.

Turning now to FIG. 9, component assemblies of a preferred form of the seed metering mechanism 32 of the present invention are schematically illustrated in exploded perspective relative to each other. As shown, the seed metering mechanism 32 of the present invention preferably comprises the housing 44, a manually operated baffle assembly 100 that is operably adjusted from outside the housing assembly 40 of the seed metering mechanism 32, a drive assembly 200, an agitator assembly 300 for inhibiting seeds from compacting within the housing assembly 32, a seed disc or plate 400 that operably divides the interior of the housing assembly 32 into a seed chamber 74 (FIG. 4) between one side of the seed plate 400 and the interior of housing 44 and the vacuum chamber 50 between the opposite side of the seed plate or disc 400 and the cover 46, a singulator assembly 500 for inhibiting more than one seed from being advanced by the seed plate or disc 400 to the discharge area of the seed metering, mechanism 32, a vibration mechanism 800 for facilitating the release of seeds from the disc 400 in the discharge area of the seed metering mechanism 32, and the cover 46 for closing the seed metering mechanism 32.

Figure 10:
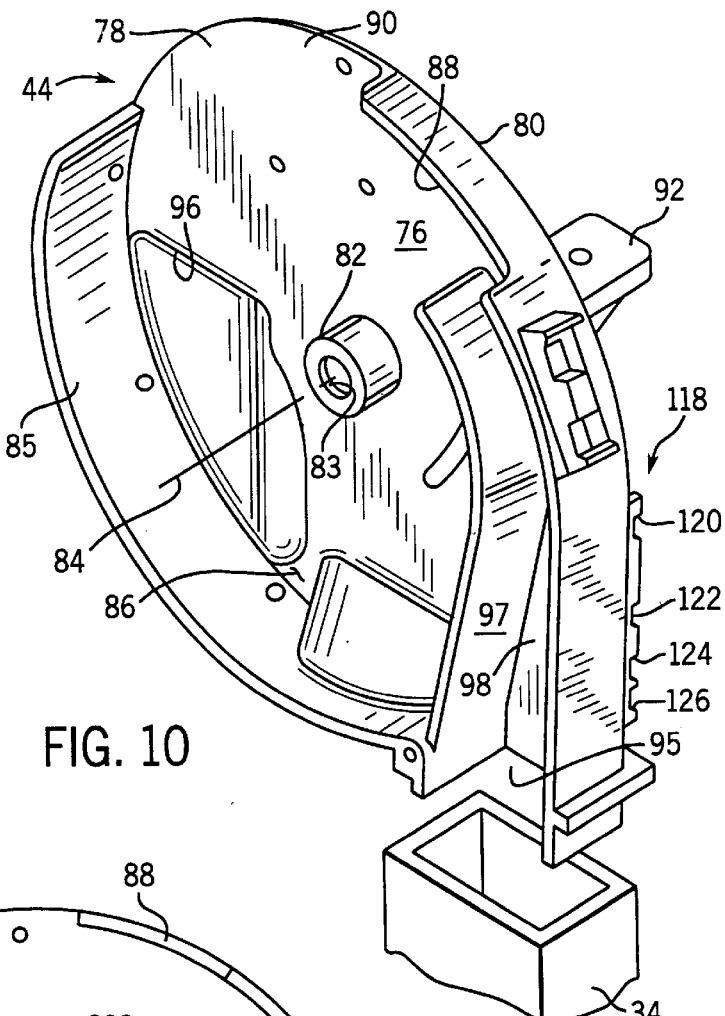
FIG. 10 is a right perspective view of a housing component forming part of the seed metering mechanism of the present invention.
Figure 11:
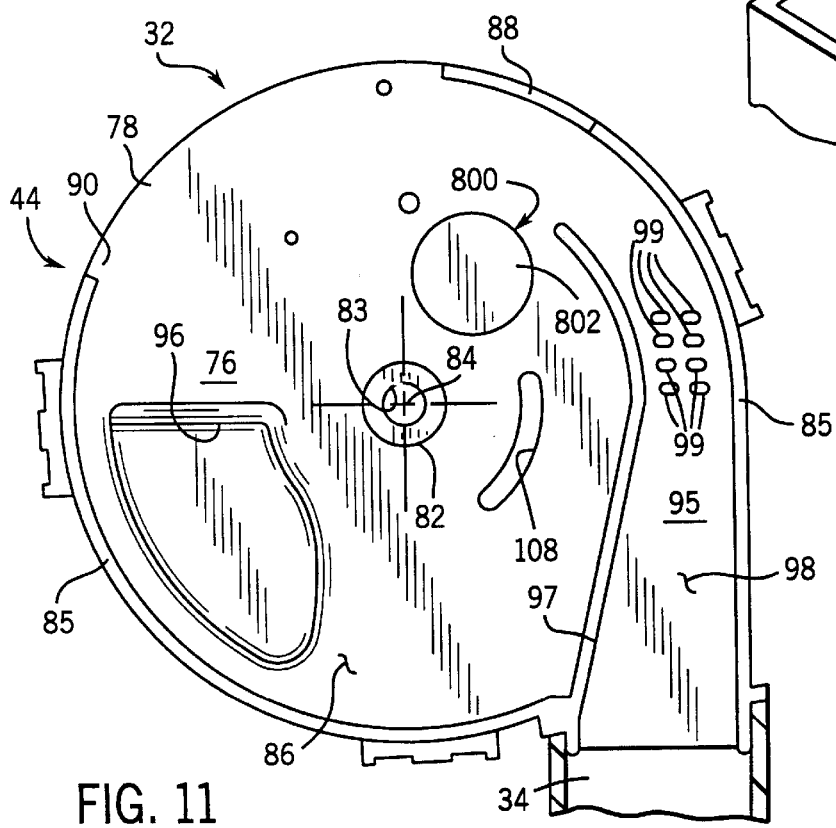
FIG. 11 is an enlarged right side view of the housing component illustrated in FIG. 10.
Figure 12:
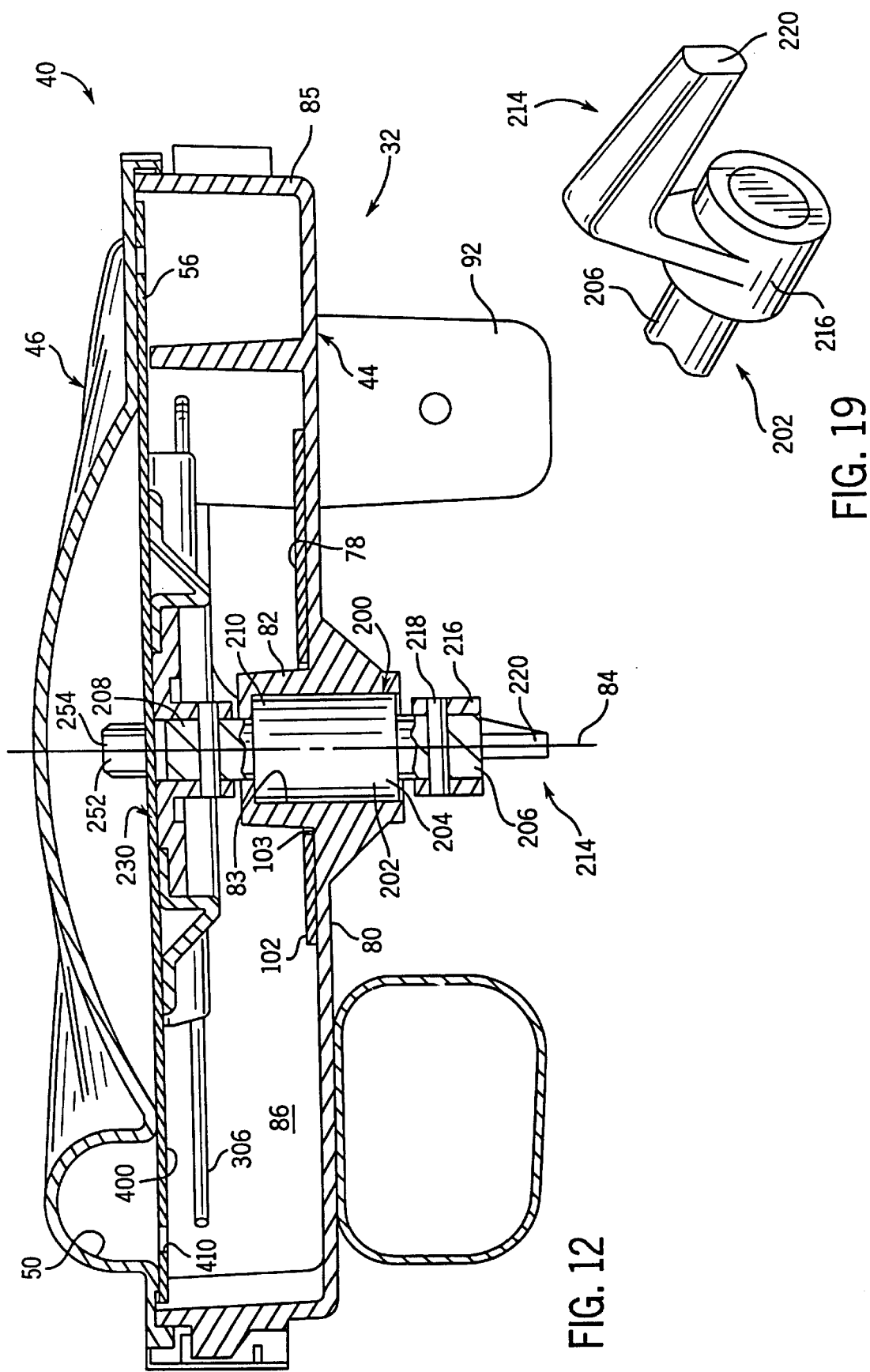
FIG. 12 is a sectional view taken along line 12—12 of FIG. 3.
Figure 13:
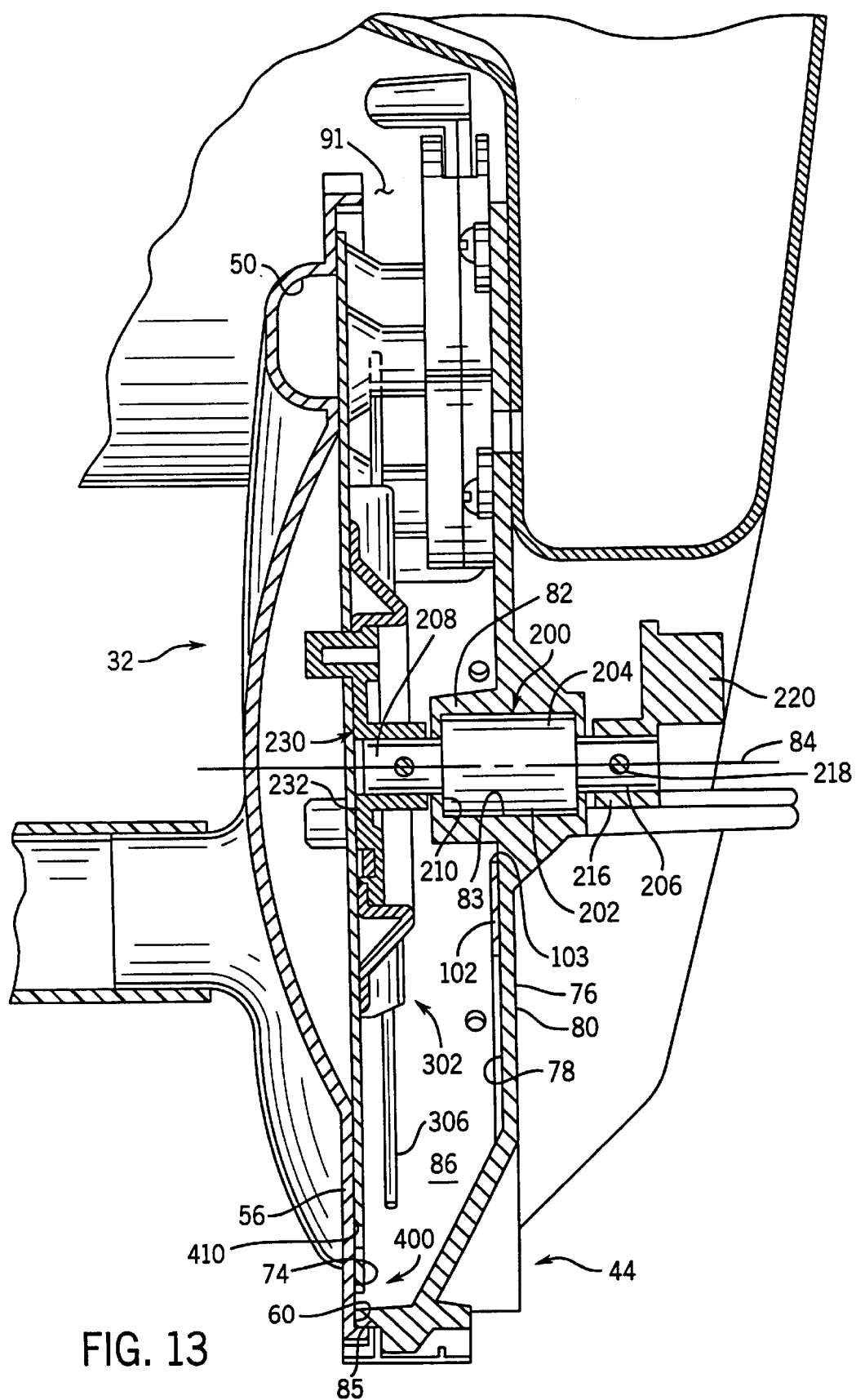
FIG. 13 is a sectional view taken along line 13—13 of FIG. 3.

As shown in FIGS. 10 and 11, housing 44 of the seed metering mechanism 32 is preferably formed from a metal material and includes a generally planar back wall 76 having inner and outer surfaces 78 and 80, respectively. An annular hub 82 is formed at the center of the housing 44 and axially projects inwardly from the inner surface 78. The annular hub 82 defines a central bore 83 defining a longitudinal axis 84 for the seed metering mechanism 32. As shown in FIGS. 12 and 13, the drive assembly 200 axially extends through and is rotatably mounted within the hub 82 of housing 44. As shown in FIGS. 9 through 11, housing 44 defines a circumferential skirt or rim 85 that axially projects forwardly from the inner surface 78 in surrounding relation to a substantial portion of outer periphery of housing 44.

As shown in FIGS. 12 and 13, an annular portion of the edge of rim 85 cooperates and combines with the flat lip area 60 on the inner surface 56 of cover 46 to close the housing assembly 32. Notably, the area surrounded by rim 85 and between the seed plate or disc 400 and the inner surface 78 of the housing 44 defines a seed reservoir or chamber 86 wherein seeds are stored.

As shown in FIGS. 10 and 11, the annular rim or skirt 85 has arcuate areas 88 and 90 that are recessed from the reminder of edge. When the cover 46 is fastened to the housing 44, these recessed areas 88, 90 define circumferentially extending openings 89 (FIG. 4) and 91 (FIG. 13) allowing atmospheric air to enter the housing assembly 32 and maintain the seeds releasably attached to the disc 400 as a function of the differential air pressures between the suction chamber 50 and the opposite side of the housing 32.

Figure 5:
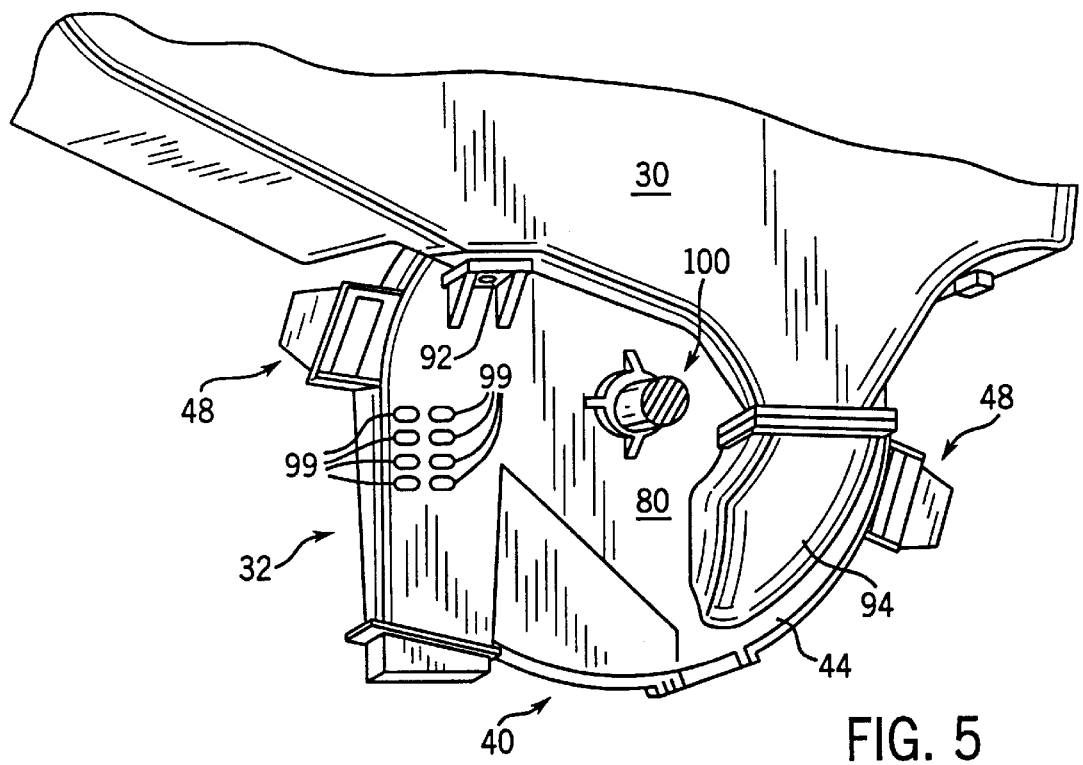
FIG. 5 is a left side perspective view of the seed metering mechanism according to the present invention.
Figure 14:
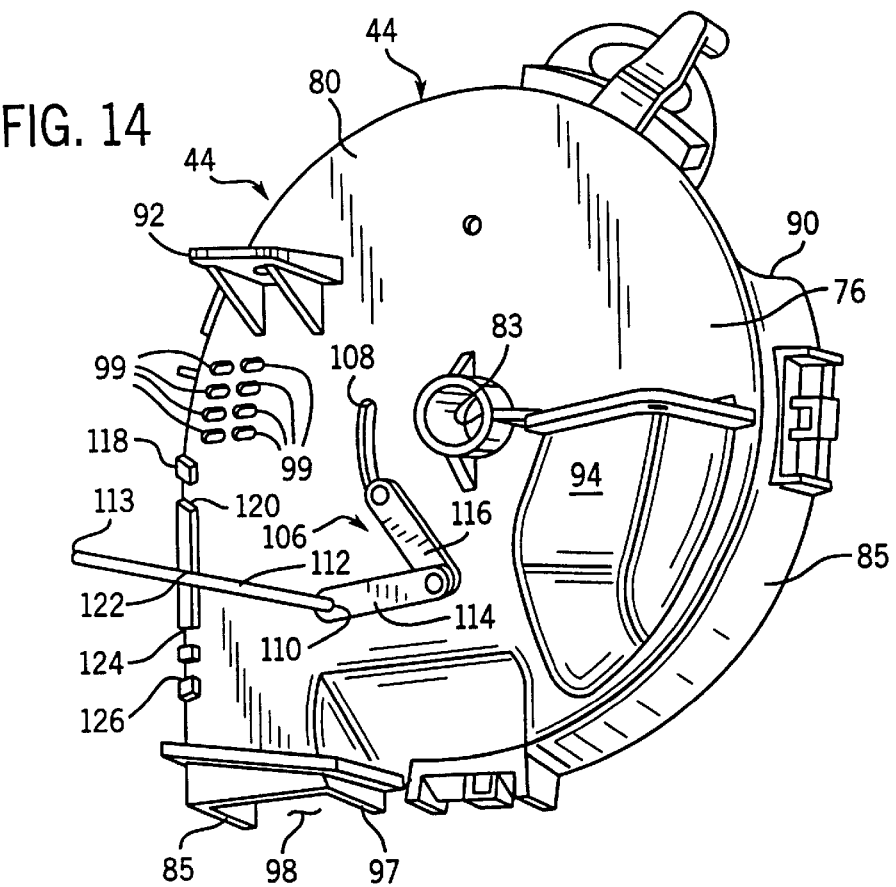
FIG. 14 is a left side view of the housing component illustrated in FIG. 10.

As shown in FIGS. 5, 10 and 14, the outer surface 80 of housing 44 defines a lug 92 which facilitates connection of the housing assembly 32 to the hopper 30. As shown, housing 44 further defines a chute 94 that allows and directs the gravitational flow of seed between the hopper 30 (FIG. 5) and the seed reservoir or chamber 86 (FIG. 12). In this regard, the back wall 76 of housing 44 defines an opening 96 (FIGS. 10 and 11) that allows seeds to pass from the chute 94 into the seed reservoir area or chamber 86 of the seed housing assembly 32.

Figure 15:
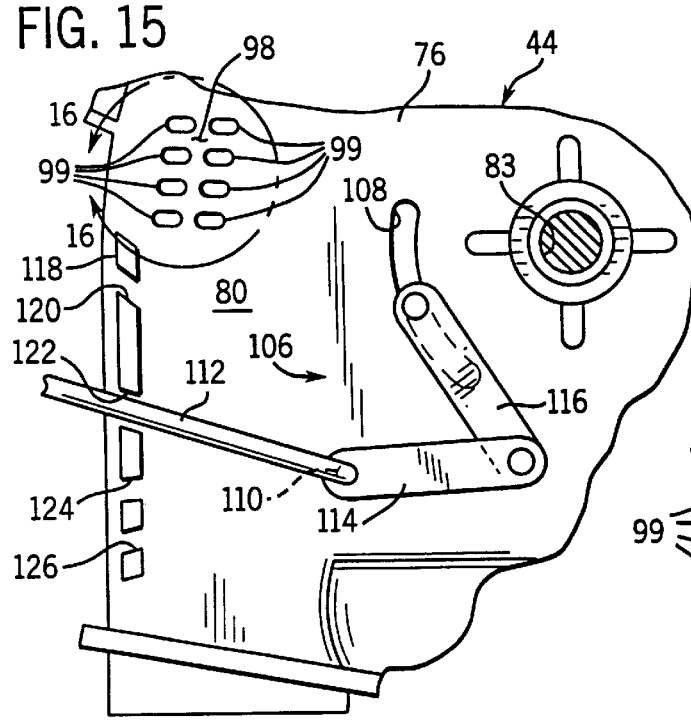
FIG. 15 is an enlarged left side view of a portion of the housing illustrated in FIG. 14.
Figure 16:
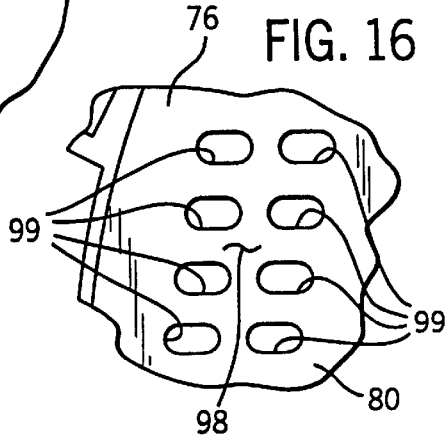
FIG. 16 is an enlarged left side view of the portion of the housing encircled in FIG. 15.

Referring to FIGS. 10 and 11, housing 44 further defines a wall 97 spaced radially inwardly from rim 85 and axially projecting from the inner surface 76 of housing 44. The space or open area 95 between the rim 85 and wall 97 defines a seed exhaust area 98 for the seed metering mechanism 32. As shown, the exhaust area 98 opens at its lower end to the seed tube 34 (FIG. 1) and through which the seeds released from the seed plate 400 gravitationally move, ultimately, for deposit onto the ground. In this regard, the back wall 76 of housing 44 defines a series of vertically spaced openings 99 that allow atmospheric air to pass into the exhaust area 98 and facilitate the flow of seeds toward the seed tube 34 by eliminating or significantly reducing the air drawn upwardly into the seed discharge area 98 of the seed metering mechanism. In the preferred embodiment of the invention, and as shown in FIGS. 15 and 16, the openings 99 preferably have slotted or elongated configurations.

Returning to FIG. 3, when the cover 46 is releasably attached to the housing 44, a substantial portion of chamber 50 extends through the seed reservoir area 86 of housing 44. Moreover, the leading end of the vacuum chamber 50 is disposed proximate to but remains outside of the discharge chute 98 of the housing 44. At its other end, suction chamber 50 terminates toward the upper end of the discharge area or chute 98 such that seeds released from the seed plate 400 pass downwardly into the discharge chute 98 and pass gravitationally toward the seed tube 34. Moreover, with the cover 46 so arranged on the housing 44, leg portion 62 of the housing overlies and closes the open side of the discharge chute 98 defined by housing 44 to prevent seeds released from the seed plate from inadvertently escaping from the housing assembly 32.

The purpose of the seed baffle assembly 100 is to control the seed level in the seed reservoir 86 from outside of the housing assembly 40. With the present invention, and as mentioned above, the cover 46 is preferably removable from the housing 44. After the cover 46 is removed and the seed plate 400 is removed, the seeds in the reservoir 86 will tend to pour out to the ground. Moreover, if there is nothing to close the opening 96 at the bottom of the chute 94, the seeds in the supply hopper 30 will likewise tend to pour onto the ground. Accordingly, the present invention provides the seed baffle assembly 100 for selectively allowing the operator to choose the level of seed mass in the reservoir 86 from outside of the housing 44. That is, and unlike other seed metering mechanisms, the seed baffle assembly 100 is adjustable from the outside and does not require the operator to gain access to the interior of the seed metering mechanism 32 in order to close off the opening 96 leading from the hopper 30.

As shown in FIGS. 9, 17 and 18, the seed baffle assembly 100 comprises a seed baffle 102 having a general planar configuration. The seed baffle 102 defines a generally central throughbore 103 that allows the seed baffle 102 to be mounted for rotation about the hub 82 of the housing 44 of housing assembly 40. As shown in FIG. 12, the seed baffle 102 is configured to mount in abutting and generally sealing relationship with the inner surface 78 of the housing 44. Notably, the profile of the seed baffle 102 is such that the baffle 102, when properly positioned relative to housing 44 of the housing assembly 40, can completely close the opening 96 (FIG. 11) at the bottom of the chute 94 through which seed is directed into the seed reservoir of housing 44.

As shown in FIGS. 14 and 15, the seed baffle assembly 100 further includes a linkage assembly 106 that is exteriorly manipulated from outside of housing 44 to effect the disposition of the seed baffle 102 and thereby control the operable size of the opening 96 in the housing 44. Returning to FIG. 11, the rear wall 76 of the housing 44 defines an arcuate slot 108 that extends through the wall 76 and has a radius concentric with the longitudinal axis 84 of the hub 82. The exterior surface 80 of the rear wall 76 of housing 44 furthermore defines a pivot 110 (FIG. 15).

In the illustrated embodiment of the invention, and as shown in FIGS. 14 and 15, the linkage assembly 106 of the seed baffle assembly 100 preferably comprises a manually operated elongated lever 112 that extends parallel to the rear wall 76 of housing 44 and is pivotally connected intermediate its ends to a pivot 110 defined on the exterior 80 of housing wall 76. A free end 113 of lever 112 extends beyond the periphery of the housing 44. An elongated link section 114 of lever 112 extends parallel to an exterior side 80 of wall 76 and away from the pivot 110 of lever 112. As will be appreciated, movement of lever 112 will result in pivotal movement of the link section 114. A second elongated link 116, arranged parallel to and extending adjacent the outer surface 80 of wall 76, is articulately joined, at one end, to the free end of link section 114 of lever 112. At its opposite end, link 116 is connected through the slot 108 to the seed baffle 102 (FIG. 17). The connection between and the travel of link 116 of linkage assembly 106 is guided by the arcuate shape of the slot 108. As will be appreciated, opposite ends of the slot 108 limit the travel of the linkage 106 and thereby the travel of the seed baffle 102 relative to the opening 96 in the rear wall 76 of the housing 44.

As shown in FIGS. 10, 14 and 15, the exterior surface 80 of wall 76 on housing 44 defines a flange 118 preferably formed integral with the housing 44 and extending generally normal to the major exterior surface 80 of the housing 44. The flange 118 defines a series of vertically spaced detents or notches 120, 122, 124 and 126. Each notch or detent 120, 122, 124 and 126 opens to a common side of flange 118 to releasably accommodate the lever 112 therewithin.

In a preferred form of the invention, the lever 112 is sized such that the free end thereof extends radially past the flange 118 for easy and ready manual engagement. In a most preferred form of the invention, and to facilitate insertion of the lever 112 into the respective notch 120, 122, 124 or 126, in the area where the lever 112 passes in proximity to the notches 120, 122, 124 and 126, the lever 112 is configured with a generally circular cross-sectional configuration. The thickness of each notch or recess 120, 122, 124 and 126 defined on flange 118 closely proximates the diameter of the lever 112. By such construction, the lever 112 can be manually and readily shifted from one notch to the other while the respective notches furthermore serve to releasably maintain the lever 112 in position selectively chosen by the operator during the functioning of the seed metering mechanism 32. As will be appreciated, movement of the lever 112 likewise effects displacement of the seed baffle 102 relative to the opening 96 thereby regulating the flow of seeds through the opening and into the seed reservoir 86.

In the illustrated form of the invention shown in FIG. 13, the notches 120 and 126 define the extreme limits of movement of the seed baffle 102 relative to the opening 96 leading to the seed reservoir 86. Moreover, it should be readily appreciated that less or more notches than that shown can be arranged on the housing 44 without detracting or departing from the spirit and scope of the present invention.

A schematic illustration of the drive mechanism 200 is provided in FIGS. 12 and 13. As shown, the drive mechanism 200 comprises a driven shaft 202 that is rotatably mounted within the bore 83 defined in the housing 44 and coaxial with the longitudinal axis 84 of the seed meter assembly 32. As shown, the driven shaft 202 has a center section 204 with reduced diameter sections 206 and 208 axially extending from opposite sides of the center section 204 and extending to respective free ends of the shaft 202. Notably, the differences in diameter between the center section 204 and the reduced diameter section 208 results in the provision of a radial shoulder 210 therebetween. In the illustrated embodiment, the radial shoulder 210 on the shaft 202 abuts with an inward projection defined by the hub 82 on the rear wall 76 of housing 44 thereby limiting axial displacement of the driven shaft 202 to the left as shown in FIG. 6.

The reduced diameter section 206 projects outwardly from the rear wall 76 of the housing 44 and has a driven coupler 214 carried at the free end thereof for releasably coupling the driven shaft 202 to a conventional drive coupler mechanism (not shown) that typically forms part of the planting unit 14. As shown in FIGS. 12, 13 and 19, the driven coupler 214 has a mounting hub 216 that fits about and is releasably connected to the reduced diameter section 206 of the driven shaft 202 as with a suitable pin 218 or the like. The driven coupler 214 furthermore includes a driven lug 220 that axially extends generally parallel to but is disposed in radially spaced relation relative to the longitudinal axis 84 of the seed metering assembly 32. As will be appreciated, movement imparted to the driven lug 220 will likewise be transferred to the mounting hub 216 and thereby to the driven shaft 202. As is well known in the art, the driven lug 220 mates with a drive lug (not shown) provided on a conventional and well known drive coupler (not shown) that is disposed on the outside of the exterior surface 80 of the housing 44 and which conventionally forms part of the drive coupler mechanism.

Figure 21:
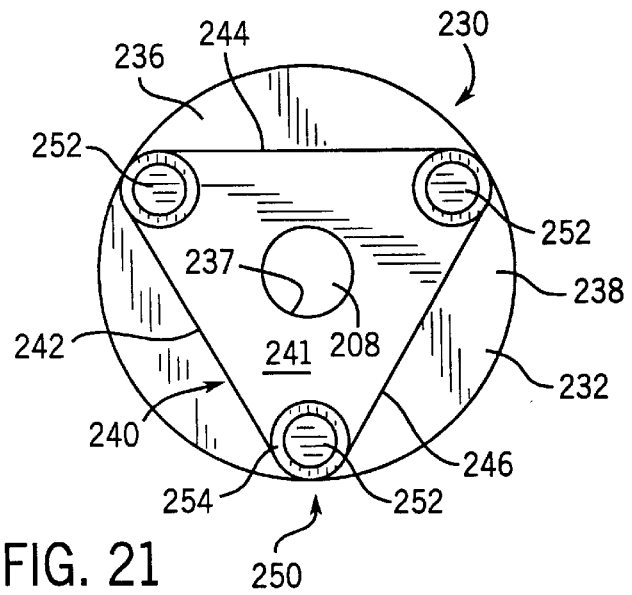
FIG. 21 is a right side view of the drive hub illustrated in FIG. 20.
Figure 22:
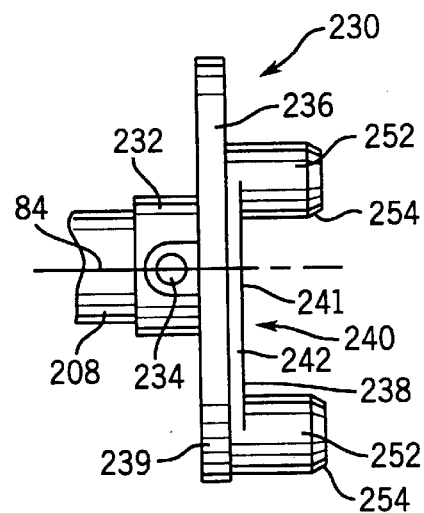
FIG. 22 is a rear elevational view of the drive hub illustrated in FIGS. 20 and 21.

A drive rotor 230 is mounted at the opposite end of driven shaft 202 on the reduced diameter section 208. As shown in FIGS. 20, 21 and 22, the drive rotor 230 comprises a mounting hub 232 that fits about and is releasably secured to the reduced diameter section 208 of the driven shaft 202 as with a suitable pin 234 (FIG. 22) or the like. Notably, and as shown in FIGS. 12 and 13, the mounting hub 232 has a greater diameter than the bore 83 defined in the hub 82 and through which the reduced diameter portion 208 axially extends. Accordingly, when the drive rotor 230 is fastened to the driven shaft 202, the driven shaft 202 is prevented from moving to the right as shown in FIGS. 12 and 13 by the mounting hub 232 abutting with the hub 82 in the housing 44 of the seed metering housing assembly 32.

Returning to FIGS. 20 through 22, the drive rotor 230 further includes first and second driving sections 240 and 250, respectively, that are arranged in centered relation about the longitudinal axis 84 of the seed metering mechanism 32. As shown, the drive rotor 230 includes an enlarged disc-like member 236 defining a central bore 237 and having generally planar axially spaced and generally parallel major surfaces 238 and 239, respectively, radially extending outwardly to the periphery of the drive rotor 230. Projecting axially outwardly from the major surface 238 of the disc-like member 236 are the first and second driving sections 240 and 250, respectively.

The first driving section 240 comprises a multi-sided configuration wherein each of the sides of the driving section 240 are equal to each other but define a flat surface area 241 that is axially spaced from and is smaller than the major surface 238 of the disc-like member 236 such that surface 238 acts as a stop for the axial arrangement of subsequent members or pieces placed thereabout as will be described in detail hereinafter. In the illustrated embodiment, driving section 240 has a generally triangular configuration including side surfaces 242, 244 and 246 that axially project from the major surface 238 of the disc-like member 236 of drive rotor 230. It will be appreciated, however, that other configurations for the driving section 240 would equally suffice without detracting or departing from the spirit and scope of the present invention. For example, the first driving section 240 could be configured with four equal sides or five equal sides that axially project away from the planar surface 238 of the disc-like member 236.

The second driving section 250 of the drive rotor 230 likewise comprises a multi-sided configuration that axially extends beyond the first driving section 240. In the illustrated embodiment, the second drive section 250 comprises a plurality of equally spaced and axially elongated pins 252. Moreover, the pins 252 are all arranged in a common radial distance from the longitudinal axis 84 of the seed metering mechanism 32. In the illustrated embodiment, each pin 252 has a generally cylindrical like configuration between opposite ends thereof. It will be appreciated, however, that other pin configurations would equally suffice without detracting or departing from the spirit and scope of the present invention. Moreover, each pin 252 has a chamfered configuration 254 at the distal end thereof for promoting axial placement of the seed metering disc 400 thereover. In the illustrated embodiment, the pins 252 are integrally formed with the disc-like member 236. It will be appreciated, however, that the pins 252 could be formed separate from and then added to the disc-like member 236.

The agitator assembly 300 is arranged in driving relation relative to the drive rotor 230 of the drive assembly 200. As mentioned, the purpose of the agitator assembly is to inhibit seeds from compacting within the seed reservoir 86 of the housing assembly 32 and helps keep the seed loose thereby facilitating their being drawn to the holes in the seed disc as the holes in the seed disc move through the reservoir in the seed housing assembly 40.

Figure 23:
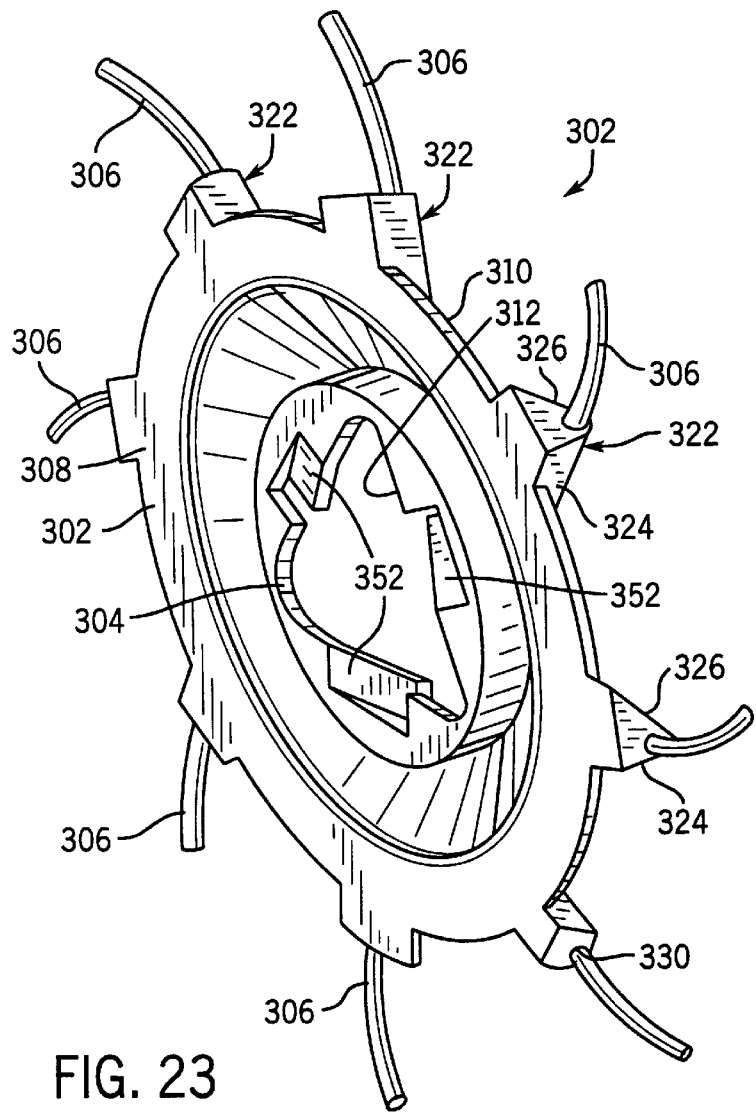
FIG. 23 is a perspective view of an agitator assembly used in combination with the seed metering mechanism of the present invention.
Figure 24:
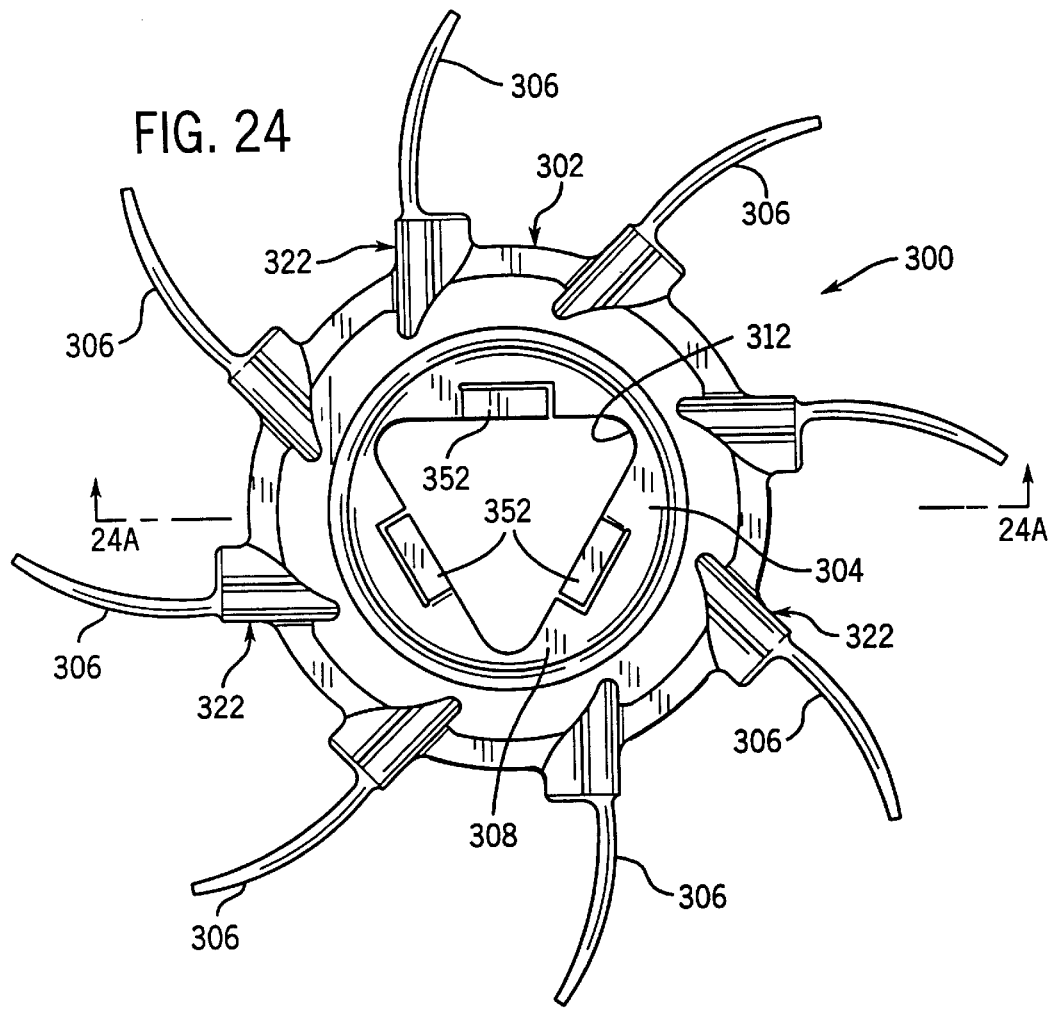
FIG. 24 is a right side view of the agitator assembly shown in FIG. 22.
Figure 24A:
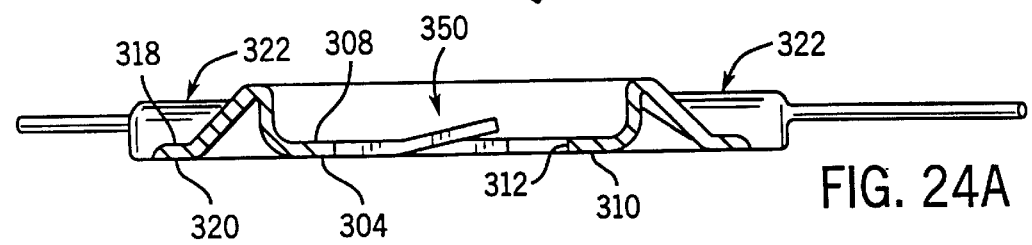
FIG. 24A is a sectional view taken along line 24A—24A of FIG. 24.

In the illustrated embodiment, and as shown in FIGS. 23 and 24, the agitator assembly 300 includes a disc shaped rotor 302 having a central hub 304 and a plurality of flexible fingers 306 radially extending from the rotor 302. As shown in FIGS. 24 and 24A, the central hub 304 is axially displaced from the remainder of the rotor 302 and has first and second generally parallel side surfaces 308 and 310, respectively. Notably, the axial distance separating the first and second surfaces 308, 310 of the central hub 304 of rotor 302 is generally equal to the axial distance the side surfaces 242, 244 and 246 project away from the major surface of the disc shaped member 236 of drive rotor 230 of the drive section 240.

The central hub 304 of agitator assembly 300 furthermore defines a centrally located through opening 312 that is configured to substantially correspond to the cross-sectional configuration of the first driving section 240 of drive assembly 200. That is, in the illustrated embodiment, the opening 312 in the rotor 302 of the agitator assembly 300 has a generally triangular configuration that substantially corresponds to the triangular shape of the first driving section 240. It will be appreciated however, that changes in the configuration of the first driving section of drive assembly 200 will be equally reflected in the shape and size of the opening 312 in the rotor 302 of the agitator assembly 300. As such, when the rotor 302 of agitator assembly 300 is mounted on the first drive section of the drive rotor 230 of drive assembly 200, a drive connection is established between the drive rotor 230 of drive assembly 200 and the rotor 302 of agitator assembly 300.

The remaining portion of the disc shaped rotor 302 radially extending from the central hub 304 has generally parallel first and second side surfaces 318 and 320, respectively. Toward the periphery of the rotor 302 there are provided a series of equally disposed receptacles 322 for releasably accommodating one end of each finger 306. Each receptacle 322 has inclined surfaces 324 and 326 projecting angularly away from the side surface 318 of the rotor 302. Such receptacles 322 act as fins or step-like extrusions. As such, and upon rotation of the rotor 302, the seed mass in the seed reservoir 86 defined by the housing 44 of the housing assembly 32, is agitated by the receptacles 322 in a manner preventing the seed mass from compacting itself during operation of the seed metering mechanism 32. Similarly, the fingers 306 projecting radially or outwardly from each receptacle 322 tends to agitate the seed mass in the housing 44 upon rotation of the rotor 302.

In a preferred form of the invention, the fingers 306 projecting outwardly from the rotor 302 range in size from about 0.080 inches to about 0.095 inches in diameter and are preferably made from a nylon-like material or other suitable flexible material such as that used in grass trimming machines. Preferably, the fingers 306 radially extend outwardly for a distance equal to about 150 mm. Notably, the fingers 306 are disposed in a swept back configuration relative to the direction of rotation of the rotor 302. As such, should the fingers 306 engage an object along their path of travel, the fingers 306 merely tend to deflect around and out of the way of the obstruction without damaging either the obstruction or the finger 306. In a most preferred form of the invention, one end of each finger 306 is releasably accommodated within a hole or opening 330 defined by each receptacle 322 on the rotor 302. Accordingly, repair or replacement of the fingers 306 is readily and easily effected. It will be appreciated, however, that it is likewise within the spirit and scope of the present invention to form the fingers 306 as permanent cast or integral part of the rotor 302.

Figure 26:
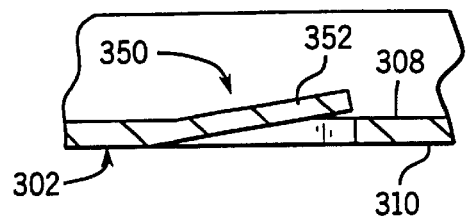
FIG. 26 is a sectional view taken along line 26—26 of FIG. 24.

As shown in FIGS. 12 and 13, the rotor 302 of the agitator assembly 300 furthermore serves to axially urge the seed plate 400 in an axial direction and toward the cover 46 of the housing assembly 32. In this regard, and as best shown in FIG. 26, the rotor 302 of the agitator assembly 300 includes spring structure 350 for resiliently urging the seed plate 400 toward the cover 46 of the housing assembly 32 to maintain a sealing relationship between the seed disc 400 and the cover 46 throughout operation of the seed metering mechanism 32. Moreover, the spring structure 350 facilitates maintaining the agitator assembly 300 in proper relationship with the seed disc 400.

Figure 25:
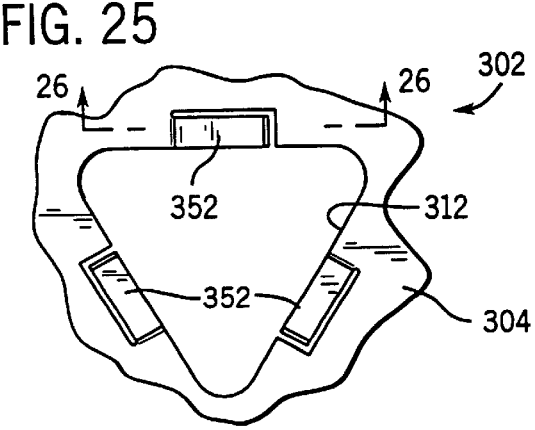
FIG. 25 is an enlarged elevational view of a central portion of the agitator assembly showing a series of springs forming an integral part of the agitator assembly.

In the illustrated form of the invention, the spring structure 350 comprises a plurality of leaf springs 352 that are preferably formed integrally with the rotor 302. As shown in FIGS. 25 and 26, and in the area of the central hub 304, preferably adjacent and parallel to each side of opening 312, the rotor 302 includes a plurality of fingers 352. In the illustrated embodiment, each finger 352 has a cantilevered configuration. That is, each finger 352 is joined at one end to the rotor 302. The free end of each finger 352, however, axially projects beyond side surface 308 of the rotor 302 to resiliently engage the seed plate 400.

During a seed planting operation, the tractor typically moves over the ground at a speed of about 4 to about 8 miles per hour. Seed spacings within the furrows can range between as little as 0.5 inches to as much as 10 inches between adjacent seeds. Accordingly, the rate of discharge from the vacuum seed metering mechanism 32 of the present invention can vary greatly from a very low discharge rate on the order of twenty seeds per second or less such as when the tractor is traveling at only about 4 miles per hour and up to 10 inch seed spacing is required to a very high rate on the order of about 130 seeds per second or greater where the tractor is traveling at a considerably faster speed and a seed spacing as little as 0.5 inches is required. It will be appreciated, therefore, that the seed metering mechanism 32 of the present invention must be capable of dispensing seeds at a rate which can vary considerably. To further complicate matters, the seed metering mechanism 32 of the present invention must be capable of handling different seeds of different sizes and surface characteristics. Ultimately, the important factor to be mastered relates to the ability to dispense seeds accurately.

Figure 27:
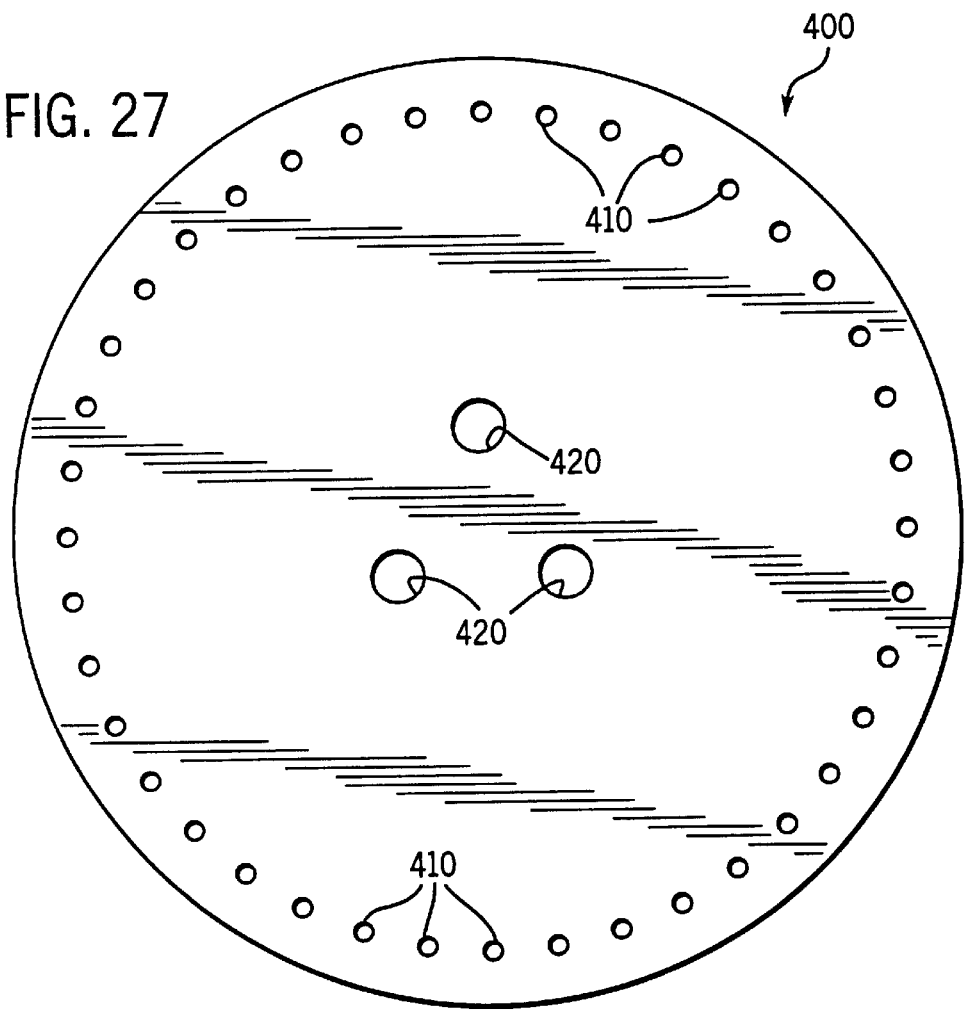
FIG. 27 is a right side view of one form of seed metering plate to be used in combination with the seed-metering mechanism of the present invention.
Figure 28:
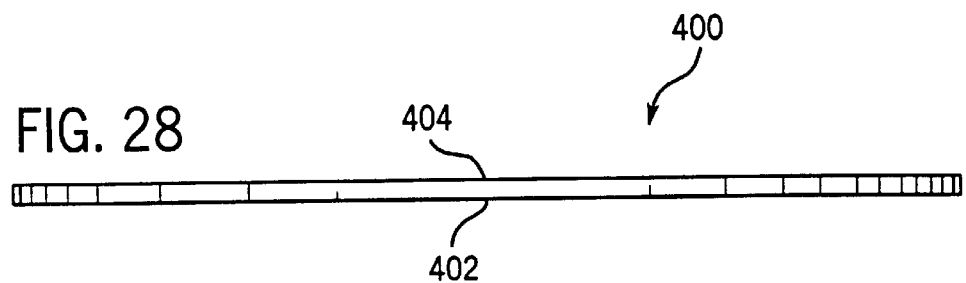
FIG. 28 is an end view of the seed-metering plate shown in FIG. 26.

In this regard, an advantageous feature of the present invention relates to the ability of quickly and easily change seed discs to accommodate the particular seed being planted. Another advantageous feature that is inherent with the design disclosed by the present invention relates to the ability to change seed discs without requiring the use of tools or other fasteners thereby significantly reducing the downtime incurred upon replacement or changing of the seed disc. Suffice it to say, and as shown in FIGS. 27 and 28, the seed disc 400 is typically comprised of a metal material. It is also within the spirit and scope of the present invention to fabricate the seed disc 400 from a suitable plastic material. In either embodiment, the seed disc 400 measures about 300 mm. in diameter. The 300 mm. size of seed disc 400 is significantly greater than any seed discs currently known in the art and allows greater versatility in planting operations. Each seed disc 400 has a diameter greater than the diameter of the radially outermost sealing face 58 on the cover 46 of the housing assembly 40.

The seed disc 400 has planar or flat first and second surfaces 402 and 404, respectively, extending generally parallel to each other. The seed disc 400 furthermore has a plurality of apertures 410 therein arranged in a circumferential row adjacent but inside of a circular outer edge 412. Each aperture 410 extends through the thickness of the seed disc 400 between the first and second surfaces 402 and 404, respectively, of the disc 400. As will be readily appreciated by those skilled in the art, and without departing or detracting from the spirit and scope of the present invention, the seed disc 400 can include additional rows of apertures (not shown) arranged closely adjacent and concentric to the first row of apertures 410. Notably, the sides or surfaces 402 and 404 of the disc 400 in the area of each opening is substantially planar or flat with the remainder of the disc 400. That is, the seed disc 400 is void of any recesses or voids arranged in surrounding relation to the openings 410. The flat configuration of the plate or disc 400 across the entirety thereof and especially in the area of the openings 410 reduces frictional contact of the outer surface of the seeds when they are released from the disc in the discharge area 98 of the seed metering mechanism.

As shown in FIG. 27, and toward the center thereof, each seed disc 400 includes a plurality of openings or drive sockets 420 that are equidistantly arranged relative to each other about a common diameter. Notably, the spacing between the openings 420 is equal to the spacing between the driving pins 252 of the second driving section 250 on the drive assembly 200. Moreover, the shape and size of the apertures 420 in discs 400 correspond to the shape of the pins 252 of the second driving section 250 of drive rotor 230. An important benefit is yielded by such construction. Because the disc 400 is mounted on the driving section 250 of drive rotor 230, the disc 400 and the openings 410 provided therein turn about a fixed axis 84 of rotation. Accordingly, the openings 410 move along a predetermined path of travel as the disc 400 turns or rotates within the housing assembly 40. Moreover, and as will be readily appreciated, different discs 400 are readily interchangeable within the seed metering mechanism 32 to accommodate different seed spacings and/or seeds having particular surface characteristics without the use of tools or fasteners. Notwithstanding the size of the seed disc 400, the openings 410 thereon travel about a predetermined path of travel between the seed chamber 86 and the discharge area 98 of the seed metering mechanism.

As stressed throughout, an important aspect of seed metering mechanism 32 of the present invention relates to the ability to dispense the seeds to the ground with accuracy. This means that one seed and no more than one seed is planted at any desired location along the length of the furrow. As well known in the industry, dispensing or discharging more than one seed into the furrow at any single location, sometimes referred to as "doubling", is undesirable at the very least and is unacceptable for the majority of planting operations. The typical unavailability of suitable nutriments in the soil will simply not sustain or support the presence of two seeds at any single location.

Figure 29:
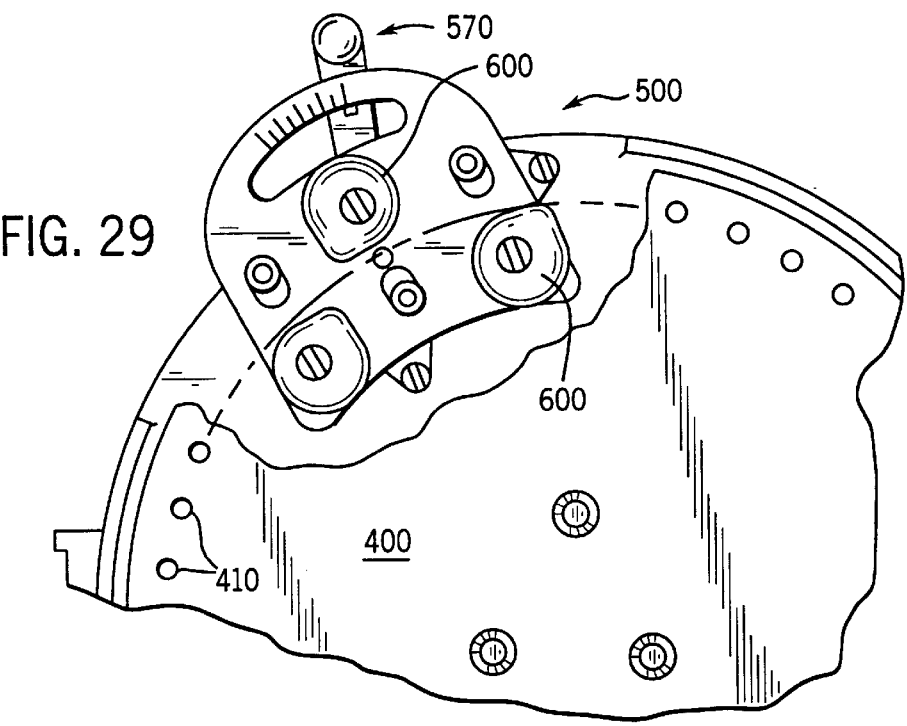
FIG. 29 is a right side view of a singulator apparatus arranged in combination with the seed-metering mechanism of the present invention.

For these and other reasons, and as shown in FIG. 29, the seed metering mechanism 32 of the present invention furthermore includes a singulator assembly 500. During operation of the seed metering mechanism 32 of the present invention, a suction is created in chamber 50 of housing 46. As such, and as the apertures 410 on the seed disc 400 move through the seed mass in the seed reservoir 86 of housing 44, one or more seed releasably attach themselves to the openings 410 in the seed disc under the influence of pressure differentials. As the seed disc 400 is drivingly rotated, the one or more seeds operably associated with each opening or aperture 410 moves with the seed disc toward the discharge area of the seed metering mechanism 32. Intermediate the location where at the seeds operably attach themselves to the seed disc 400 and the seed discharge area of the seed dispensing mechanism from which the seeds gravitationally fall to the ground, the singulator assembly 500 of the present invention is provided to insure that one and only one seed is present in each opening or aperture 410 as the particular seed pocket or opening approaches the discharge area of the seed dispensing mechanism 32. The seed singulator mechanism is indicated generally by reference numeral 500 in FIG. 29. In the illustrated form of the invention, the singulator assembly 500 is shown attached to the backwall 78 of housing 44 of the housing assembly 40 as through a plurality of a plurality of suitable fasteners 502 and 504 and is less sensitive to revolving speed of the seed disc 400 than are known seed singulator devices.

Figure 30:
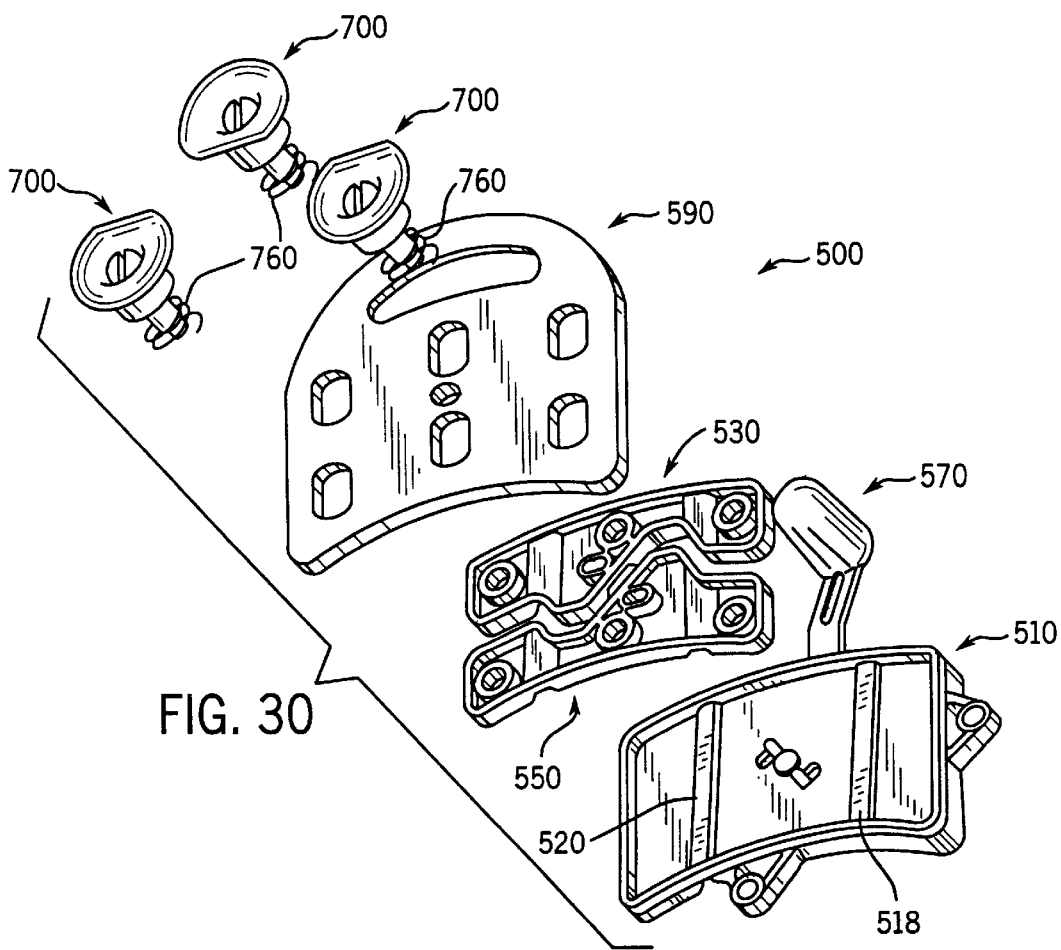
FIG. 30 is an exploded perspective view of the singulator apparatus shown in FIG. 29.

Turning to FIG. 30, one form of a singulator assembly 500 is shown in exploded perspective view. As shown, the singulator assembly comprises a base 510, a pair of manually movable brackets 530 and 550, a manually operated adjustment mechanism 570, and a cover 590. Notably, one of the unique features of the present invention concerns the ability of the component parts of the singulator assembly 500 to be assembled and adjusted relative to each other without the use of screws or other fasteners. Accordingly, no tools are required for assembly or adjustment of the singulator assembly of the present invention thereby reducing downtime normally incurred during the planting operation when adjustment of the seed singulator is required or desired. Another salient aspect of the singular assembly 500 relates to the provision of at least three singulator spools 700 that are mounted in specifically spaced relation relative to the path of travel of the apertures 410 of the seed disc 400. While the singulator assembly 500 is shown arranged in combination with a seed disc 400 having a single row of openings 410 provided thereon, it should be appreciated that the singulator assembly of the present invention is equally applicable, with minor variations, to seed discs having two or more rows of openings thereon.

Figure 31:
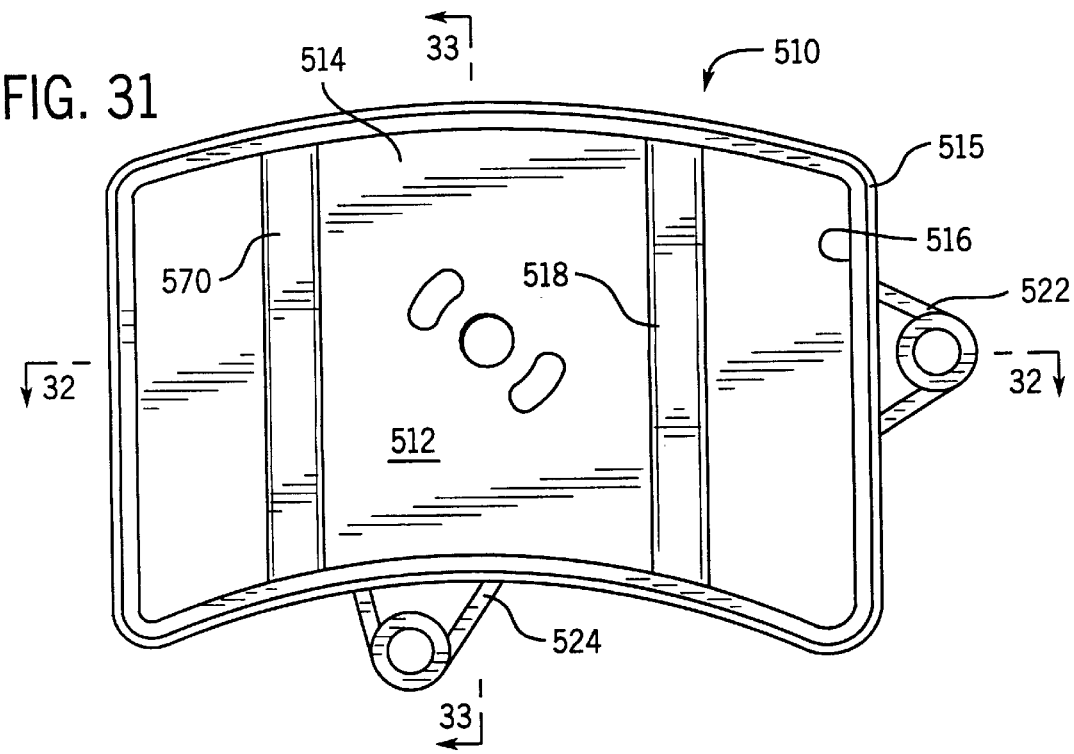
FIG. 31 is a right side view of a base forming part of the seed singulator.
Figure 32:
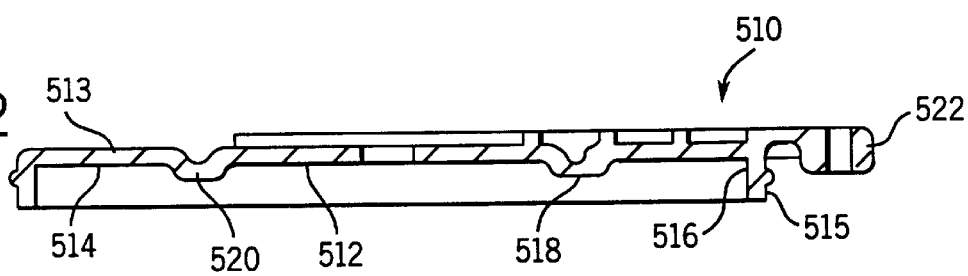
FIG. 32 is a sectional view taken along line 32—32 of FIG. 31.
Figure 33:
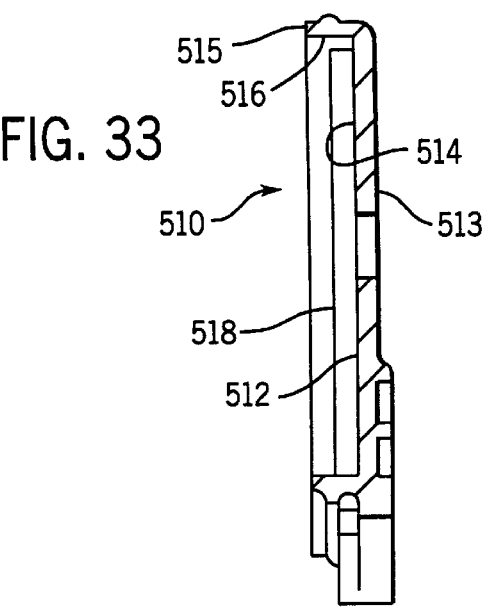
FIG. 33 is a sectional view taken along line 33—33 of FIG. 31.

Turning now to FIGS. 31 through 33, the base 510 of the singulator assembly 500 includes a generally rectangular back wall 512 having a back side 513 and a front side 514. Preferably, wall 512 of base 510 further includes a closed rim 515 extending about the peripheral edge of the back wall 512 and axially away from the front side 514 to define an enclosure or open cavity 516. A pair of vertical disposed and horizontally spaced rails 518 and 520, respectively, are provided within the enclosure 516. As shown in FIG. 31, the rails 518 and 520 are preferably integrally formed with the base 510. It will be appreciated, however, that rails 518, 520, which are independently formed relative to the base 510, would equally suffice. Apertured flanges 522 and 524 extend outwardly from the base 510 so as to allow releasable affixation of the base 510 to the housing 44 of the housing assembly as with suitable fasteners. Moreover, base 510 furthermore defines a central throughbore or opening 526 with radially elongated slots 527 and 528 that pass entirely through the base 510. The slots 527 and 528 are arranged in diametrically opposed relation relative to each other and in generally concentric relationship relative to the bore or opening 526.

Figure 34:
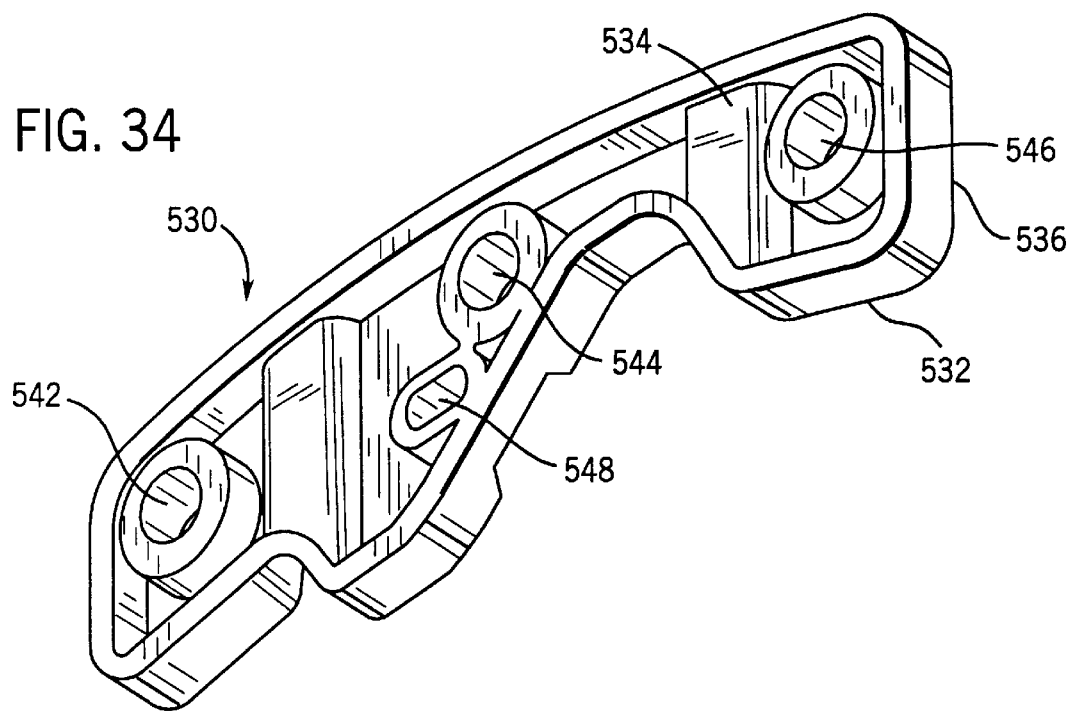
FIG. 34 is a perspective view of one form of singulator mount forming part of the singulator assembly.
Figure 35:
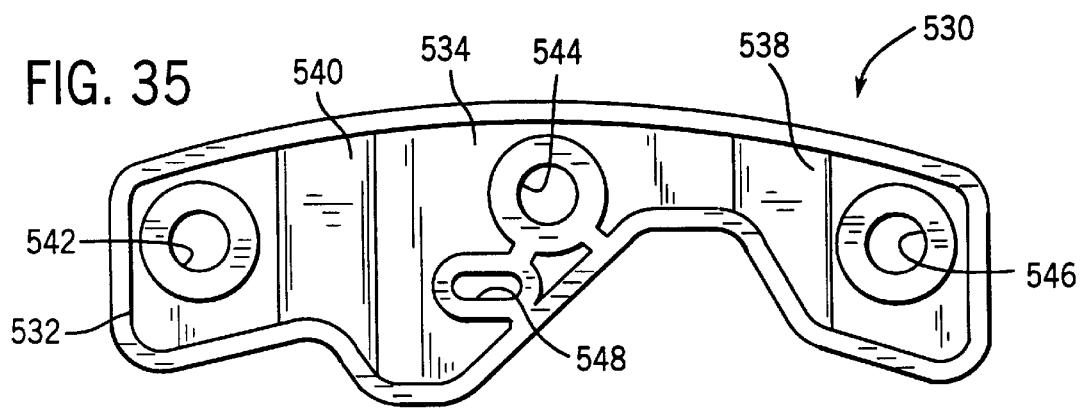
FIG. 35 is a right side view of the singulator mount shown in FIG. 33.
Figure 36:
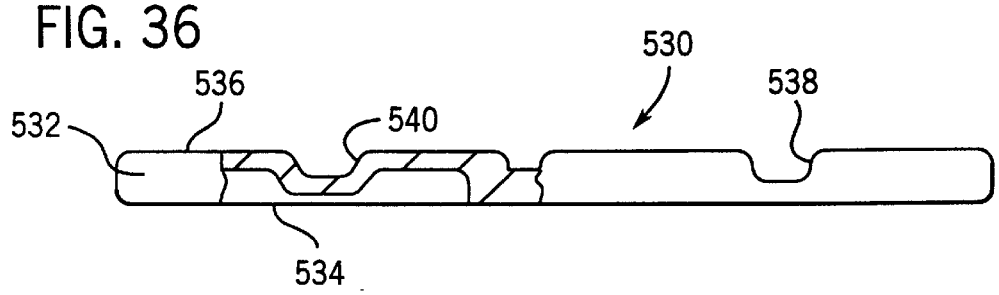
FIG. 36 is a top elevational view, partly in section, of the singulator mount illustrated in FIG. 35.

Bracket 530 is shown in FIGS. 34 through 36. As shown, bracket 530 includes a slidable member 532 that is preferably formed from hard plastic or nylon and is configured to slidably fit for vertical movement within the recess or opening 516 of base 510. Bracket member 532 includes a top surface 534 and a bottom surface 536. A pair of vertically disposed and horizontally spaced channels 538 and 540, respectively, are provided and extend along the bottom surface 536 of the bracket member 532. Notably, the size and spacing of the channels 538 and 540 are complementary to the size and spacing of the rails 518 and 520 on the base 510. Bracket member 532 further defines a plurality of horizontally spaced and internally threaded recesses 542, 544 and 546. The threaded recesses 542, 544 and 546 defined by bracket 532 are located in circumferentially spaced relation relative to each other on a common line of centers or a radius which is generally equal to the radius about which the holes or apertures 410 in the seed disc 400 are disposed. Bracket 532 further defines an elongated generally horizontal slot or opening 548 that passes between and opens to both the top and bottom surfaces 534 and 536, respectively, of bracket member 532.

Bracket 550 is shown in FIGS. 37 through 39. As shown, bracket 550 includes a slidable member 552 that is preferably formed from hard plastic or nylon and is configured to slidably fit for vertical movement within the recess or opening 516 of base 510 in vertically disposed relation to bracket 530. Bracket member 552 includes a top surface 554 and a bottom surface 556. A pair of vertically disposed and horizontally spaced channels 558 and 560, respectively, are provided and extend along the bottom surface 556 of the bracket member 552. Notably, the size and spacing of the channels 558 and 560 are complementary to the size and spacing of the rails 518 and 520 on the base 510. Bracket member 552 further defines a plurality of horizontally spaced and internally threaded recesses 562, 564 and 566. The threaded recesses 562, 564 and 566 defined by bracket 552 are likewise located on a common radius which is generally equal to the radius about which the holes or apertures 410 in the seed disc 400 are disposed. Bracket 552 further defines an elongated generally horizontal slot or opening 568 that passes between and opens to both the top and bottom surfaces 554 and 556, respectively, of bracket member 552.

The manually operated adjustment mechanism 570 for the singulator assembly is shown in FIGS. 40 through 42. As shown, the adjustment mechanism 570 comprises an elongated lever 572. The lower end of lever 572 is provided with a mounting pin 574 and a pair of actuating pins 576 and 578 disposed in equally spaced relation and on opposite sides of the mounting pin 574. Notably, the mounting pin 574 is preferably formed integral with the lever 572 which is formed from plastic or nylon.

With the brackets 530 and 550 arranged in the enclosure 516 defined by base 510, the lever 572 is arranged on the backside 513 of the base 510 and the mounting pin 574 is inserted endwise through the opening 526 in the base 510. Notably, the diameter of the mounting pin 574 is substantially equal to the diameter of the hole or opening 526 in the base 510 such that the lever 572 is permitted to pivotally move and rock about an axis 575 defined by the mounting pin 574. Similarly, the actuating pins 576 and 578 on the lever 572 project endwise through the arcuate slots 527 and 528, respectively, of the base 510. As such, the actuating pin 576 on lever 572 projects into the slot or opening 548 defined on bracket 530 while actuating pin 578 projects into the slot or opening 568 defined on bracket 550. As will be appreciated by those skilled in the art, this arrangement allows the brackets to vertically move toward and away from each other along the rails 518 and 520 defined in the enclosure 516 of base 510 in response to manual pivotal or rocking movement of the lever 572 about the axis 575. To facilitate movement of the lever 572, the upper end of lever 570 is provided with a handle 580 that projects generally normal to the handle or lever 572 to readily allow manual manipulation of the handle or lever 570.

Figure 43:
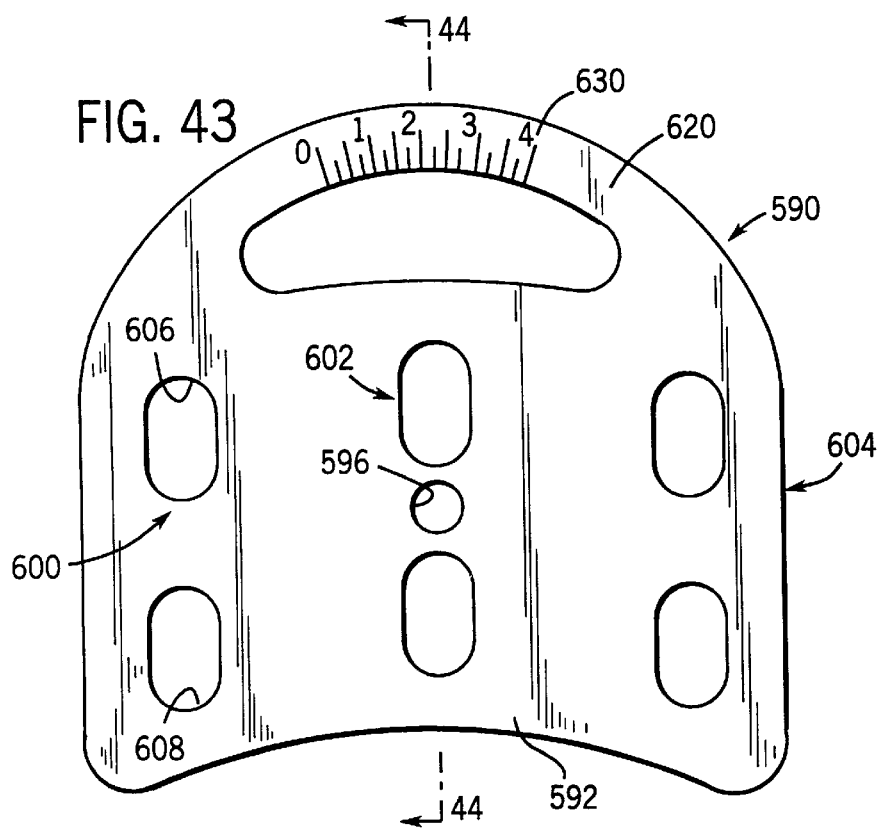
FIG. 43 is a side view of a cover forming part of the singulator apparatus of the present invention.
Figure 44:
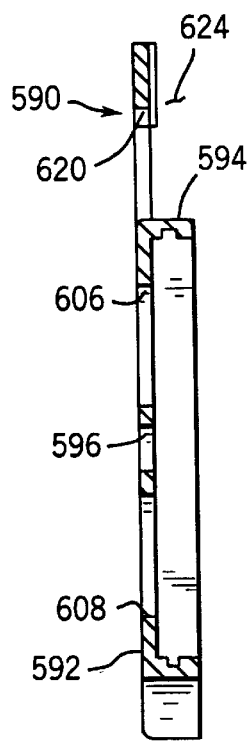
FIG. 44 is a sectional view taken along line 44—44 of the cover illustrated in FIG. 43.

The cover 590 for the singulator assembly 500 is schematically illustrated in FIGS. 43 and 44. The cover 590 preferably includes a generally rectangular front wall 592 having a closed rim 594 extending about the peripheral edge thereof. Notably, the configuration of the front wall 592 and the rim 594 closely proximates if not corresponds to the configuration of the back wall 512 and closed rim 514 on base 510. Cover 590 furthermore includes a central throughbore or opening 596 that is adapted to resiliently receive the free end of the mounting pin 574 of lever 572. Preferably, the free end of the mounting pin 574 is configured to resiliently fit through the opening 596 in the front wall 592 of cover 590 in a manner securing the front wall 592 of cover 590 to the base 510 without use of further fasteners and yet allowing access to the interior of the singulator assembly when required.

Cover 590 further defines a plurality of vertically aligned and horizontally spaced pairs of openings 600, 602 and 604. Each vertically aligned pair of openings 600, 602 and 604 comprises two vertically elongated slots 606 and 608. As will be appreciated, the horizontal spacing between the pairs of openings 600, 602 and 604 is equal to the horizontal spacings between the threaded recesses 542, 544 and 546 of bracket 532 and the recesses 562, 564 and 566 of bracket 552. As will be appreciated, the elongated configuration of the openings 600, 602 and 604 allows for vertical displacement of the brackets 530 and 550 within the recess 516 of the base 510.

Cover 590 furthermore defines a generally vertical upstruck and arcuate bracket 620 that is generally coplanar with the top surface 622 of the cover 590. Notably, the bracket 620 has a relatively thin construction and thus a void or space 624 is provided on the rear side of the bracket 620. It is within this space or void 624 wherein the upper end of the lever 572 moves. Moreover, the bracket 620 is configured such that the handle 580 of lever 572 can extend thereover. Additionally, the top surface of the bracket 620 has indicia 630 thereon for readily providing a visual indication of the position of the lever 572.

Figure 45:
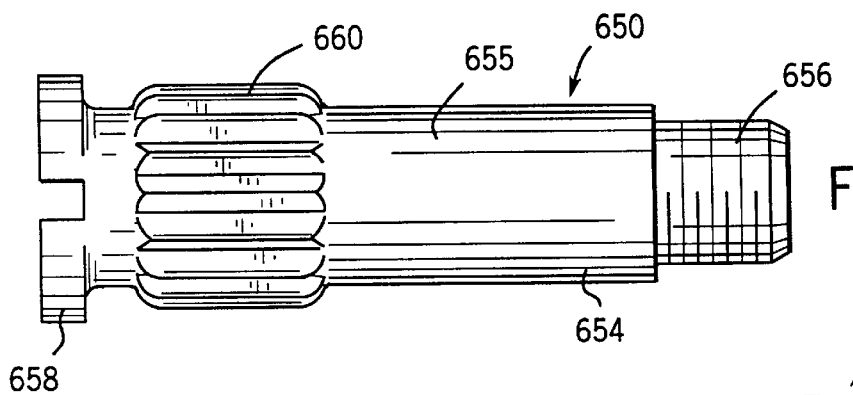
FIG. 45 is a elevational view of a spool stud forming part of the singulator apparatus shown in FIGS. 29 and 30.
Figure 46:
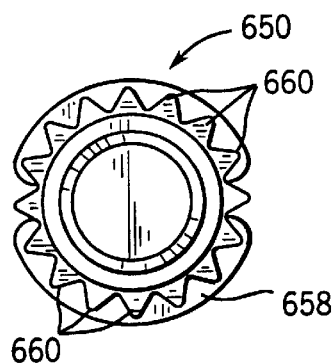
FIG. 46 is an end view of the spool stud shown in FIG. 45.

The singulator assembly 500 further comprises a series of mounting studs 650 on which the singulator spools 700 are mounted. An exemplary form of stud 650 for mounting a single singulator spool 700 to the singulator assembly 500 is shown in FIGS. 45 and 46. As shown, each stud 650 comprises an elongated member 654 having a shank portion 655 with a shouldered and externally threaded end 656 and an enlarged head portion 658 at an opposite end thereof. Preferably, each stud member 654 is formed of metal. In the illustrated embodiment, each stud 650 is provided with a series of axially extending external splines 660 axially extending from the head portion 658 of each stud for about one-half the length thereof. Each stud 650 is provided with 4, 6, 8, 12 or more splines 660 as desired. Notably, the outside diameter of the stud member 654 is sized such that it is permitted to endwise pass through the vertically elongated slots 606 and 608 comprising each pair of openings 600, 602 and 604 in the cover 590 of the singulator assembly 500. Moreover, the external threading at end 656 of each stud member 654 corresponds to the internal threading or a metal insert (nut) within the recesses 542, 544 and 546 of bracket 530 (FIGS. 34 through 36) and within the recesses 562, 564 and 566 of bracket 550 (FIGS. 37 through 35). Furthermore, it should be noted that the axial length of each spool member 702 is less than the axial distance separating the enlarged head portion 658 and the external threading 656 of each spool mounting stud 650.

Figure 47:
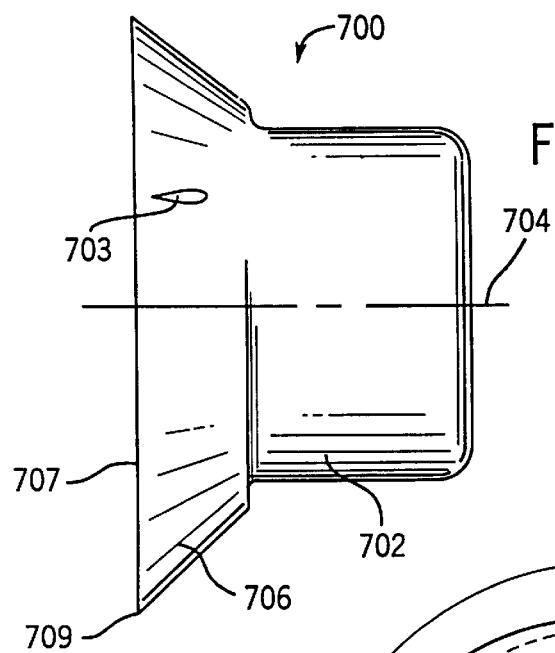
FIG. 47 is an elevational view of one form of singulator spool that can be used in combination with the singulator apparatus of the present invention.
Figure 48:
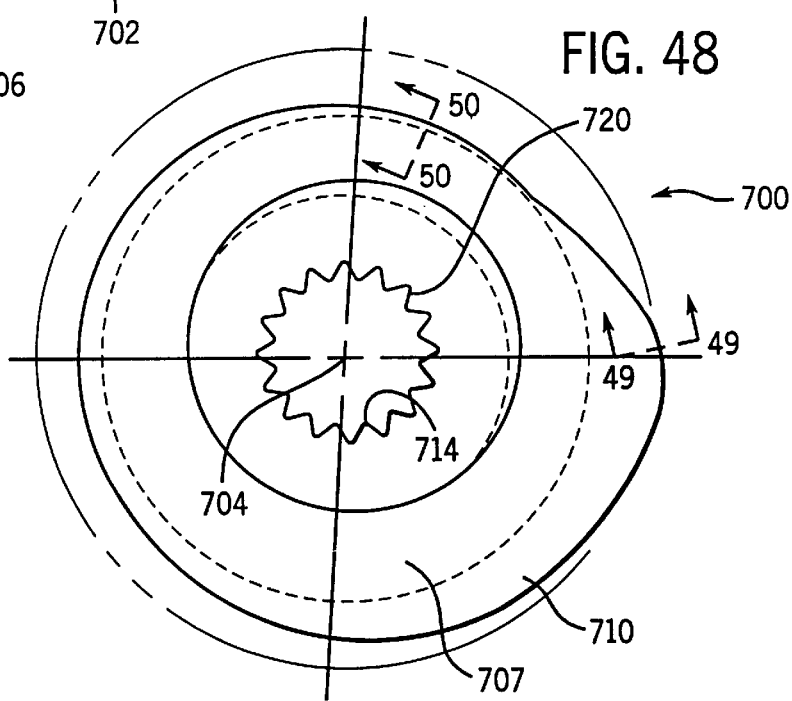
FIG. 48 is a side view of the singulator spool illustrated in FIG. 47.
Figure 49:
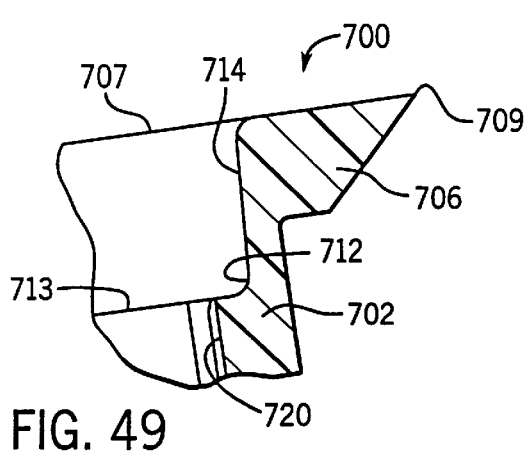
FIG. 49 is a partial sectional view taken along line 49—49 of FIG. 48.
Figure 50:
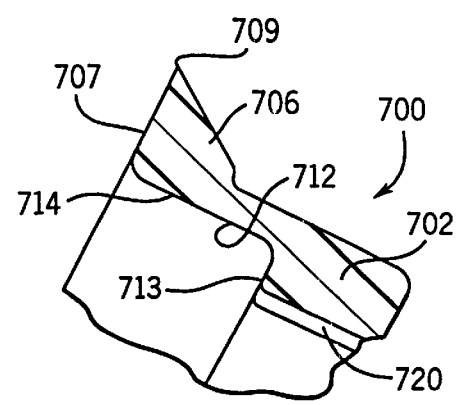
FIG. 50 is a partial sectional view taken along line 50—50 of FIG. 48.

An exemplary form of singulator spool 700 is schematically illustrated in FIGS. 47 through 50. As shown in FIG. 47, each singulator spool 700 comprises an elongated preferably metal tubular member 702 defining a longitudinal axis 704 which, when mounted to the seed metering mechanism, extends generally normal or perpendicular to the sides of the seed disc 400. In the illustrated embodiment, and at that end 706 of each spool disposed closely adjacent the seed disc 400 during operation of the seed metering mechanism, each spool member 702 preferably has a seed engaging portion projecting radially outwardly from the remainder of the spool. As shown, each spool member 702 preferably has a flared or frusto-conical seed engaging or surface configuration extending away from a planar bottom surface 707 defined by the spool member 702. As shown in FIGS. 47, 49 and 50, the flared profile at the free end 706 of each spool 700 increases in diameter toward end 706. Moreover, and as shown in FIGS. 47, 49 and 50, the bottom planar edge 707 of the spool 700 and the flared end 706 intersect with each other to define a relative sharp edge 709 extending about the periphery of the spool 700.

As shown in FIG. 48, the peripheral edge 710 of the free end 706 of spool member 702 has a changing or eccentric profile relative to the longitudinal axis 704 of the spool member 702. That is, the seed engaging portion of each arcuate segment of the edge 710 of the enlarged free end of the spool member 702 is disposed at different radial distance from the longitudinal axis 704 of the spool member 702. The changing or eccentric profile allows or permits a changing circumferential surface area of the seed deflector portion of each spool 700 to be selectively positioned relative to the predetermined path of travel of the openings thereby changing the spacing of the seed deflector relative to the fixed path of travel of the openings 410 in the seed disc 400 and relative to each other. In this regard, and as shown in FIG. 47, the spool member 702 has a locating mark 703 thereon for providing a visual indication of the setting of the seed deflector 706 relative to the fixed path of travel of the seeds carried by the disc 400. In the illustrated embodiment, the locator or indicating mark 703 is provided adjacent or on the seed engaging surface portion of the seed deflector. It will be appreciated, however, that the locating or indicating mark can be provided elsewhere on the spool 700 without detracting or departing from the spirit and scope of the present invention. The locating mark 703 readily permits all the spool members arranged on the singulator assembly 500 to be adjusted equally away or toward the center of the openings 410 on the seed disc 400.

As shown in FIGS. 49 and 50, each spool member 702 further defines an opening 712 extending axially through the spool member 704. As will be appreciated, rather than providing the peripheral edge 710 of the seed contacting surface eccentric relative to the axis 704 of the spool, it is also within the spirit and scope of the present invention to provide the opening 712 in eccentric relationship relative to the spool member.

At the flared end 706, the opening 712 in each spool member 704 has an enlarged counterbore portion 714 that is sized to accommodate the enlarged head portion 658 of the mounting stud 650 (FIGS. 45 and 46). The counterbore portion 714 of opening 712 is recessed or has a depth that allows the spool to be endwise moved without exposing the head portion 658 of the spool mounting 650 therebeyond. Because the enlarged counterbore portion 714 and the opening 712 are of different diameters, a radial wall or annular shoulder 713 is defined therebetween. Upon assembly, the enlarged head portion 658 engages with the annular shoulder 713 thereby limiting movement of the spool 700 relative to side of the seed disc 400. As mentioned, the overall length of the spool member 702 is less than the length of the mounting stud 650 thereby allowing axial or endwise displacement of the spool member 702 along the length of the stud 650. In this regard, a lengthwise portion of the opening 710 is provided with a series of internal splines 720 that are engagable with the external splines 660 on each mounting stud 650 for holding the seed engaging portion of the respective spool 700 in releasably fixed relation relative to the axis of rotation 704.

As mentioned above, the end 706 of each spool 700 has a flared or frusto-conical configuration. The conical spool surface serves to perpendicularly lift and remove multiples of seeds from the seed disc 400 such that gravity can act thereon and return the multiple seeds to the seed reservoir of the seed metering mechanism 32. Moreover, the conical surface on each spool member 700 also disrupts and gently separates a multiplicity of seeds that are held together on one seed hole 410 thus allowing the multiple seeds to fall under the influence of gravity and return to the seed reservoir of the seed metering mechanism 32.

Preferably, the slanted or angular configuration at the free end 706 of the spool 700 changes as a function of the angular orientation of the slanted surface relative to the longitudinal axis 704 of the spool 700. That is, the angular orientation of the flared end 706 of spool 700, in the area shown by lines 49—49 in FIG. 48, is equal to about a 45° to about a 50° angle relative to the planar bottom edge of the spool 700. In contrast, the angular orientation of the flared end 706 of spool 700, in the area shown by lines 50—50 in FIG. 48, may equal about 45° to 50° relative to the planar bottom edge 707 of the spool 700. As will be appreciated, the inclined surface configurations extending about the seed engaging portion of each spool defines an included angle ranging between about 35° and about 70° between the inclined surface configuration and the adjacent face or side of the seed disc 400. Accordingly, the singulator assembly 500 can be finely tuned or precisely adjusted simply by turning each singulator spool 700 about its own axis 704. That is, different effects or removal forces can be imparted to the seeds carried on the seed plate as a function of which angular orientation of the spool 700 is disposed relative to the seed pocket or opening 410 in the seed plate 400. When assembled to the seed metering mechanism, each spool 700 is arranged such that the flared end 706 extends into the path of travel of the seed openings 410. In a most preferred from of, the invention, each spool 700 is adjusted such that the flared end 706 covers approximately one-half the diameter of each opening 410 in the seed disc 400.

As will be appreciated, the changing profile of the free edge 710 allows the disposition of the spool 700 to be manually changed relative to the path of movement of the openings 410 on the seed disc 400 moving therepast. The interaction of the external spline like configurations 660 on the stud 650 and the internal spline like configurations 720 on the spool 700 prevent the spool 700 from turning or rotating relative their respective stud 650. Also, however, it is important to note that the interaction between the splines 660 and 720 allows the angular orientation of the spool 700 to be angularly adjusted as required to effect the necessary action relative to the seeds carried by the seed plate 400 toward the discharge area of the seed metering mechanism 32 of the present invention. It will be readily appreciated, of course, that the opening 710 in the spool 700 can be eccentric relative to the longitudinal axis 704 of the spool member 702 thereby effecting different adjustments of the spool 700 relative to the circular path of travel of the openings 410 in the seed disc 400.

Returning to FIG. 30, each spool 700 is mounted on a respective mounting stud 650 as shown. Notably, however, there is further provided a compression spring 760 or other form of resilient means for resiliently urging the spool axially outward and away from the cover 590 toward the seed disc 400. As such, the planar bottom surface of the spool 700 is resiliently urged toward an adjacent relationship with the seed plate 400 and the edge 709 of the spool serves to engage and orient the seeds traveling toward the discharge area of the seed metering mechanism 32. In a preferred form of the invention, the spring 760 urges the planar bottom surface of the spool 700 into resilient engagement with the flat side of the seed disc 400 such in a manner compensating for wear of the spool 700 or axial movement of the disc 400 away from the spool 700 as a result of wear on the sealing surfaces of the housing assembly 40.

The spring 760 furthermore allows the spool to be axially displaced against the action of the spring 760 until the cooperative instrumentalities, which in the illustrated embodiment includes the splines 660 on mounting member 650 and the splines 720 of the spool 700, are released from each other thereby allowing rotation of the spool 700 about the axis 714 thereby adjusting the seed engaging surface relative to the predetermined path of the openings 410 on the seed disc 400. As mentioned, the recessed bore 714 is sized to allow for axial displacement of the spool 700 relative to the mounting member 650 without exposing the head portion 658 thereof. After the seed engaging portion of the spool is properly positioned relative to the path of travel of the seed openings 410 in the disc 400, the spool 700 is automatically returned to an operable position wherein the seed engaging portion is disposed adjacent the side of the disc 400 under the influence of the compression spring 760. Thereafter, the cooperating instrumentalities on the mounting member 650 and spool releasably hold the seed engaging portion of the spool in fixed relation relative to the axis 714.

With the present invention, a single singulator spool or up to six singulator spools can be used as part of the singulator assembly 500. As shown in FIG. 29, in a preferred form of the invention, normally two singulator spools 700 will be arranged to one side of the arcuate path of travel of the openings in the seed disc 400 while at least one singulator spool 700 will be arranged on the opposite side of the arcuate path of travel of the openings 410 in the seed disc 400. As will be appreciated from an understanding of the present invention, the singulator assembly 500 offers several degrees of adjustment for orientating the seeds within the pockets or openings 410 of the disc 400 as well as for disengaging surplus seeds from the plate 400. First, the singulator spool 700 may be individually adjusted by turning or rotating the singulator spool 700 relative to its respective mounting stud 650. Thus, different profiles on the singulator spool 700 can be properly orientated relative to the path of travel of the openings between adjacent spools 700.

Alternatively, the singulator assembly 500 can be adjusted through use of the handle 570, to move the brackets 530 and 550 that carry the singulator spools 700. As will be appreciated, movement of the brackets 530 and 550 endwise within the cavity 516 defined by base 510 will move the singulator spools 700 carried by the brackets 530 and 550 relative to the arcuate path of travel of the openings 410 on the seed disc 400 thereby further effecting adjustment of the singulator apparatus 500. To properly adjust the brackets 530 and 550 and the spools 700 carried thereon relative to the fixed path of travel of the openings 410 in the disc 400, the indicia 630 provided on the cover 590 of the singulator apparatus 500 visually guides the operator to adjust the spools 700.

Still another salient feature of the present invention relates to improving the release of the seeds from the seed disc 400 at the discharge area 98 of the seed metering mechanism 32. Testing has revealed that imparting vibrations to the housing assembly 40 of the seed metering mechanism 32 facilitates the release of seeds from the seed plate 400 in the discharge area of the mechanism 32. In this regard, and as shown in FIG. 11, there is preferably provided a mechanism 800 for imparting vibrations to the housing assembly 40. The vibration imparting mechanism 800 can take a myriad of shapes and sizes. Mechanism 800 can be driven in any suitable manner. Preferably, a mechanism that produces vibrations in the range of about 115 hz. to about 135 hz. appears to work well. In the illustrated form of the invention, an electrically operated vibration type mechanism including a housing 802 is securely fastened in and about the seed discharge area 98 of the seed metering mechanism and appears to operate satisfactorily. As will be appreciated, the vibration mechanism 800 can be mounted inside or outside of the housing 40 without departing or detracting from the spirit and scope of the present invention. Moreover, the vibrating mechanism 800 can be secured to the cover 46 to impart vibrations to the housing assembly 40.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed:

1. A seed metering mechanism comprising:
   a housing including a seed chamber and a suction chamber, said housing further defining an inlet through which seeds are loaded and a discharge area from whence seeds are discharged to the ground;
   a disc rotatably supported within the housing, a first side of the disc facing the suction chamber and a second side of the disc facing the seed chamber, said disc further defining a circular array of openings movable along a predetermined path of travel during rotation of the disc, the openings extending through the disc to accommodate and carry seeds from the seed chamber to the seed discharge area due to pressure differentials acting on the seeds; and
   a seed singulator assembly disposed proximate the second side of the disc between a position wherein seeds are initially drawn to the openings in the disc and the discharge area of the housing to eliminate multiples of seeds at each opening, said seed singulator assembly including a first seed deflector radially arranged to one side of the path of travel of the openings and a second seed deflector radially arranged to an opposite side of the path of travel of the openings, the seed deflectors being spaced apart such that only a single seed carried by each opening is permitted to pass therebetween and resiliently biased toward a predetermined position relative to the second side of the seed disc to compensate for wear of the seed disc and the seed deflector.

2. The seed metering mechanism according to claim 1 wherein said housing is comprised of a stationary generally circular member with a cover releasably fastened thereto.

3. The seed metering mechanism according to claim 2 wherein said cover defines an opening through which air can be evacuated to create a vacuum in the suction chamber of the seed metering housing.

4. The seed metering mechanism according to claim 1 wherein each seed deflector includes a tubular member having an integral seed engaging portion projecting radially therefrom.

5. The seed metering mechanism according to claim 4 wherein the seed engaging portion of each tubular member has a frusto-conical configuration.

6. The seed metering mechanism according to claim 5 wherein the tubular member of each seed deflector is mounted for rotation about an axis extending generally perpendicular to the sides of the seed disc.

7. The seed metering mechanism according to claim 4 wherein the seed engaging portion of each tubular member has a nonuniform circumferential surface area extending thereabout to facilitate adjustment of the seed deflector relative to the path of travel of the openings in the disc.

8. The seed metering mechanism according to claim 7 wherein the tubular member of each seed deflector is mounted for rotation about an axis extending generally perpendicular to the sides of the seed disc such that different portions of the nonuniform circumferential surface area of the seed deflector portion are selectively positionable about the axis of rotation to effectively alter the spacing between the seed deflectors.

9. The seed metering mechanism according to claim 1 wherein each seed deflector is mounted for rotation about an axis extending generally perpendicular to the sides of the seed disc.

10. The seed metering mechanism according to claim 1 wherein the seed singulator assembly includes a base assembly disposed proximate the second side of the seed disc, each seed deflector being removably mounted to the base assembly.

11. A seed metering mechanism comprising:
a housing defining a discharge area from whence seeds are deposited to the ground;
a seed disc rotatably supported within and effectively dividing said housing into a seed chamber, wherein a supply of seeds are held, and a vacuum chamber, said seed disc having a first side facing the suction chamber and a second side facing the seed chamber, said disc further defining a circular array of openings, each opening being capable of accommodating and carrying a seed along a predetermined path of travel during rotation of the disc from the seed chamber to the seed discharge area due to pressure differentials thereacross; and
a seed singulator assembly mounted adjacent the second side of the disc upstream of the discharge area of the housing relative the rotation of the disc to eliminate multiples of seeds carried by each opening, said seed singulator assembly including a pair of movable brackets arranged in radially spaced relation relative to each other with at least one seed deflector provided on each bracket so as to be positioned on opposite sides of the path of travel of the openings, and a lever to operate a pair of cams in communication with the brackets so as to adjust the spacing between the seed deflectors such that only a single seed carried by each opening is permitted to pass therebetween.

12. The seed metering mechanism according to claim 11 wherein each seed deflector includes a seed engaging portion projecting outwardly from one end thereof.

13. The seed metering mechanism according to claim 12 wherein each seed deflector is mounted for rotation about an axis extending generally perpendicular to the sides of the seed disc.

14. The seed metering mechanism according to claim 13 wherein the seed engaging portion of each seed deflector is disposed adjacent the second side of the seed disc and has a surface configuration to remove and promote downward movement of seeds from the seed disc so as to eliminate multiple seeds carried by each opening.

15. The seed metering mechanism according to claim 14 wherein each seed deflector includes structure to hold the seed engaging portion thereof in releasably fixed relation relative to said axis of rotation.

16. The seed metering mechanism according to claim 11 wherein each seed deflector has a tubular configuration with a seed engaging portion projecting radially outwardly from one end thereof.

17. The seed metering mechanism according to claim 16 wherein each seed deflector is mounted for rotation about an axis extending generally perpendicular to the sides of the seed disc.

18. The seed metering mechanism according to claim 17 wherein the seed engaging portion of each seed deflector is disposed adjacent the second side of the seed disc and has an inclined surface configuration extending circumferentially thereabout.

19. The seed metering mechanism according to claim 18 wherein the inclined surface configuration of the seed engaging portion of each seed deflector changes along different circumferential portions of the seed deflector.

20. The seed metering mechanism according to claim 19 wherein each seed deflector has a locating mark thereon to provide a visual indication of the orientation of the seed deflector relative the path of travel of the openings defined by the seed disc.

21. The seed metering mechanism according to claim 18 wherein the inclined surface configurations extending about the seed engaging portion of each seed deflector defines an included angle ranging between about 35° and 65° between the inclined surface configuration and the second side of the seed disc.

22. The seed metering mechanism according to claim 18 wherein each seed deflector includes structure to hold the seed engaging portion thereof in releasably fixed relation relative to said axis of rotation.

23. The seed metering mechanism according to claim 16 wherein an outer edge of the inclined surface configuration on each seed deflector has an asymmetrical circumferential configuration such that various portions of the outer edge are disposed at different radial distances from the axis of rotation of the seed deflector.

24. The seed metering mechanism according to claim 23 wherein each seed deflector is configured to hold the seed engaging portion thereof in releasably fixed relation relative to said axis of rotation.

25. The seed metering mechanism according to claim 24 wherein each seed deflector has a locating mark thereon to provide a visual indication of the outer edge of the seed deflector relative the path of travel of the openings defined by the seed disc.

26. The seed metering mechanism according to claim 16 wherein the axis of rotation of each seed deflector is arranged eccentric relative to an outer edge of the inclined seed engaging portion of the seed deflector.

27. The seed metering mechanism according to claim 26 wherein each seed deflector is configured to hold the seed engaging portion thereof in releasably fixed relation relative to said axis of rotation.

28. The seed metering mechanism according to claim 27 wherein each seed deflector has a locating mark thereon to provide a visual indication of the outer edge of the seed deflector relative the path of travel of the openings defined by the seed disc.

29. The seed metering mechanism according to claim 11 wherein each seed deflector of the seed singulator assembly is biased toward the second side of the seed disc.

30. The seed metering mechanism according to claim 11 wherein at least one bracket includes at least two seed deflectors thereon in circumferentially spaced relation relative to each other and along a common line of centers whereby three seed deflectors can be cooperatively arranged relative to each other to eliminate multiple seeds carried by each opening as the seeds are moved between the seed chamber and the discharge area of the seed metering mechanism.

31. The seed metering mechanism according to claim 30 wherein the lever operates the pair of cams to adjust simultaneously the radial positions of the brackets relative to each other so as to adjust simultaneously and equally the seed deflectors relative to the path of travel of the openings in the seed disc.

32. The seed metering mechanism according to claim 11 wherein each seed deflector is removably mounted to the respective bracket on which it is provided.

33. A seed metering mechanism comprising:
a rotatable seed disc having two opposed sides and a circular array of generally equidistantly spaced holes opening to the two sides of the disc proximate a periphery thereof for movement along a predetermined path of travel during rotation of the disc;
a housing arranged about the seed disc and defining a seed loading station, wherein seeds are captured by the holes on the seed disc, and a seed unloading station, whereat seeds are released from the seed disc for deposit to the ground; and
a seed singulator assembly carried by said housing on one side of the disc upstream of the seed unloading station relative the rotation of the disc to eliminate multiples of seeds carried by each hole, said seed singulator assembly including at least one seed deflector mounted on opposite sides of the path of travel of the holes with the spacing between the seed deflectors being such that only a single seed carried by each hole is permitted to pass therebetween, each seed deflector being mounted for rotation about an axis extending generally perpendicular to the sides of the seed disc.

34. The seed metering mechanism according to claim 33 wherein said housing has a split configuration including a stationary housing including a back wall with a circumferential skirt extending axially away therefrom and a cover releasably secured to the stationary housing.

35. The seed metering mechanism according to claim 34 wherein the seed singulator assembly is mounted to the back wall of the stationary housing, and wherein the skirt extending about the stationary housing defines a slot which permits portions of the seed singulator assembly to extend radially therebeyond.

36. The seed metering mechanism according to claim 33 wherein each seed deflector includes a seed engaging portion projecting outwardly from one end thereof.

37. The seed metering mechanism according to claim 36 wherein the seed engaging portion of each seed deflector is disposed adjacent the one side of the seed disc and has an inclined surface configuration.

38. The seed metering mechanism according to claim 36 wherein each seed deflector includes structure to hold the seed engaging portion thereof in releasably fixed relation relative to said axis of rotation.

39. The seed metering mechanism according to claim 33 wherein each seed deflector has a tubular configuration with a seed engaging portion projecting radially outwardly from one end thereof.

40. The seed metering mechanism according to claim 39 wherein the seed engaging portion of each seed deflector is disposed adjacent the one side of the seed disc and has an inclined surface configuration extending circumferentially thereabout.

41. The seed metering mechanism according to claim 40 wherein the inclined surface configuration of the seed engaging portion of each seed deflector changes about different circumferential portions of the seed deflector.

42. The seed metering mechanism according to claim 41 wherein the inclined surface configuration extending about the seed engaging portion of each seed deflector defines an included angle ranging between about 40° and 65° between the inclined surface configuration and the one side of the seed disc.

43. The seed metering mechanism according to claim 41 wherein each seed deflector includes structure to hold the seed engaging portion thereof in releasably fixed relation relative to said axis of rotation.

44. The seed metering mechanism according to claim 43 wherein each seed deflector has a locating mark thereon to provide a visual indication of the orientation of the seed deflector relative the path of travel of the holes defined by the seed disc.

45. The seed metering mechanism according to claim 41 wherein an outer edge of the inclined surface configuration of each seed deflector has an asymmetrical circumferential configuration such that various portions of the outer edge are disposed at different radial distances from the axis of rotation of the seed deflector.

46. The seed metering mechanism according to claim 45 wherein each seed deflector is configured to hold the seed engaging portion thereof in releasably fixed relation relative to said axis of rotation.

47. The seed metering mechanism according to claim 46 wherein each seed deflector has a locating mark thereon to provide a visual indication of the outer edge of the seed deflector relative the path of travel of the holes defined by the seed disc.

48. The seed metering mechanism according to claim 46 wherein the axis of rotation of each seed deflector is arranged eccentric relative to an outer edge of the inclined seed engaging portion of the seed deflector.

49. The seed metering mechanism according to claim 48 wherein each seed deflector is configured to hold the seed engaging portion thereof in releasably fixed relation relative to said axis of rotation.

50. The seed metering mechanism according to claim 33 wherein each seed deflector of the seed singulator assembly is biased toward the second side of the seed disc.

51. The seed metering mechanism according to claim 33 wherein said seed singulator assembly further includes a pair of movable brackets arranged in radially spaced relation relative to each other, at least one of the seed deflectors being mounted to each bracket for movement therewith.

52. The seed metering mechanism according to claim 51 wherein at least one bracket includes at least two seed deflectors thereon in circumferentially spaced relation relative to each other and along a common line of centers whereby three seed deflectors can be cooperatively arranged relative to each other to eliminate multiple seeds carried by each hole as the seeds are moved between the seed loading station and the seed unloading station of the seed metering mechanism.

53. The seed metering mechanism according to claim 52 wherein the seed singulator assembly further includes an adjustment mechanism to adjust selectively the positions of the brackets for radial adjustment of the seed deflectors relative to the path of travel of the holes in the seed disc.

54. The seed metering mechanism according to claim 51 wherein the seed singulator assembly further includes an adjustment mechanism to adjust simultaneously the radial positions of the brackets relative to each other so as to adjust simultaneously and equally the seed deflectors relative to the path of travel of the holes in the seed disc.

55. The seed metering mechanism according to claim 33 wherein the seed singulator assembly includes a base assembly disposed proximate the one side of the seed disc, each seed deflector being removably mounted to the base assembly.

56. A seed metering mechanism to deposit seeds into a furrow, said seed metering mechanism comprising:
   a circularly shaped and rotatably driven seed disc having two opposed sides and a circular array of equidistantly spaced holes opening to the two sides of the disc adjacent the periphery thereof for movement along a predetermined path of travel during rotation of the disc;
   a housing arranged about the seed disc and defining a seed loading station, whereat seeds are drawn to and entrapped by the holes on the seed disc, and a seed unloading station, whereat seeds carried by said disc are released therefrom for discharge toward the ground; and
   a seed engaging assembly carried by said housing on one side of the seed disc downstream of the seed loading station and upstream of the seed unloading station relative to rotation of the disc to preposition a seed relative to a respective hole in the disc before the seed is carried to the seed unloading station such that each seed has a substantially identical drop trajectory said seed engaging assembly including a pair of seed engaging members mounted adjacent one side of the disc on opposite sides of the path of travel of the holes in the seed disc each seed engaging member having a tubular configuration with an angled surface formed as a frusto-conical axial extension to engage and align each seed relative to the respective hole as the seed is carried therepast.

57. The seed metering mechanism according to claim 56 wherein each seed engaging member is mounted for rotation about an axis extending generally normal to the sides of the disc.

58. The seed metering mechanism according to claim 57 wherein each seed engaging member includes structure to hold the angled surface in releasably fixed relation relative to said axis of rotation.

59. The seed metering mechanism according to claim 58 wherein the angled surface of each seed engaging member has a nonuniform surface configuration such that different orientations of said seed engaging member relative to said axis of rotation effectively changes the distance separating the seed engaging surface of the seed engaging member relative to the predetermined path of travel of the holes in the seed disc.

60. The seed metering mechanism according to claim 57 wherein each seed engaging member defines a mark to indicate visually the orientation of the seed engaging surface relative to the path of travel of the holes in the seed disc.

61. The seed metering mechanism according to claim 57 wherein the frusto-conical extension of each seed engaging member has a surface configuration that changes as a function of its circumferential orientation about said axis or rotation.

62. The seed metering mechanism according to claim 57 wherein an outer edge of the frusto-conical extension of each seed engaging member has an asymmetrical circumferential configuration such that various portions of the outer edge are disposed at different radial distances from the axis of rotation of the seed engaging member.

63. The seed metering mechanism according to claim 57 wherein the frusto-conical extension of each seed engaging member terminates in an outer edge, and the axis of rotation of each seed engaging member is eccentric relative to the outer edge of the extension.

64. The seed metering mechanism according to claim 56 wherein an included angle ranging between about 30° and about 70° is established between the angled surface of each seed engaging member and the respective one side of the seed disc.

65. The seed metering mechanism according to claim 56 further including an adjustment mechanism to adjust selectively the positions of the seed engaging members relative to the path of travel of the holes in the seed disc.

66. The seed metering mechanism according to claim 56 wherein the seed engaging assembly further includes an adjustment mechanism to adjust simultaneously the radial positions of the seed engaging members relative to each other so as to adjust simultaneously and equally the seed engaging members relative to the path of travel of the holes on the seed disc.

67. The seed metering mechanism according to claim 56 wherein each seed engaging member is resiliently biased toward the one side of the seed disc.

68. The seed metering mechanism according to claim 56 wherein the seed engaging assembly includes a base assembly disposed proximate the one side of the seed disc, each seed engaging member being removably mounted to the base assembly.

69. A seed singulator assembly for use in combination with a seed metering mechanism having a housing defining a seed chamber wherein seeds are held, a seed disc rotatable mounted within said housing, said seed disc including a circular array of holes adjacent a periphery of the seed disc to carry seeds along a circular path of travel from the seed chamber to a seed discharge area of the seed metering mechanism during rotation of the seed disc so as to deliver seeds to the discharge area of the seed metering mechanism from whence the seeds are deposited to the ground, the seed singulator assembly comprising:
   a housing assembly to be located proximate the seed disc;
   a pair of seed singulators removably mounted on said housing assembly of the seed singulator assembly such that the seed singulators are arranged on opposite sides of the circular path of travel of the seeds, each seed singulator including a seed engaging surface arranged adjacent a side of the seed disc relative to the path of travel of the seeds; and
   an apparatus to alter the disposition of the seed engaging surfaces of the seed singulators relative to the path of travel of seeds.

70. The seed singulator assembly according to claim 69 wherein the housing assembly comprises a base and a cover releasably attached to the base.

71. The seed singulator assembly according to claim 70 wherein the apparatus includes a pair of brackets arranged on opposite sides of the path of travel of the seeds, each bracket being slidably mounted on the base of the housing assembly for linear movement toward and away from the path of travel of the seeds and having at least one seed singulator mounted thereon.

72. The seed singulator assembly according to claim 71 wherein at least one bracket includes at least two seed singulators thereon about a common line of centers such that two seed singulators can be arranged to one side of the path of travel of the seeds with another seed singulator arranged to located on the opposite side of the path of travel of the seeds.

73. The seed singulator assembly according to claim 71 wherein said brackets include cooperating instrumentalities thereon for linear guidance of the brackets and the seed singulators carried thereby relative to each other.

74. The seed singulator assembly according to claim 71 wherein the apparatus includes a cam operated mechanism carried by the base of the housing assembly to adjust simultaneously the disposition of the seed engaging surfaces of the seed singulators relative to the path of travel of the seeds.

75. The seed singulator assembly according to claim 74 wherein the cam operated mechanism includes a manually operated lever supported for rotation by the base of the housing assembly and two actuators to impart positively and simultaneously movement to the pair of brackets, said movement being directed toward and away from the path of travel of the seeds.

76. The seed singulator assembly according to claim 75 wherein said lever includes a shaft rotatably extending through the base and to which the cover of the housing assembly is secured without the use of separate fasteners.

77. The seed singulator assembly according to claim 75 wherein said lever includes a shaft journalled for rotation by said housing and two actuators disposed in generally parallel radially spaced relation relative to said shaft, and wherein each bracket defines an elongated slot for slidably accommodating a lengthwise portion of one of said actuators therewithin such that upon rotation of said shaft said brackets are moved linearly relative to said base.

78. The seed singulator assembly according to claim 75 wherein said housing assembly includes markings thereon to indicate visually the disposition of the seed singulators relative to the path of travel of the seed as a function of the position of the lever relative to said markings.

79. The seed singulator assembly according to claim 69 wherein each seed singulator is mounted for rotation about an axis extending generally normal to said disc.

80. The seed singulator assembly according to claim 79 wherein the seed engaging surface of each seed singulator has an angled configuration disposed in confronting relation relative to the path of travel of the seeds, and wherein the angled seed engaging surface of each seed singulator has a nonuniform surface configuration such that said seed engaging surface is disposed in a different relative relationship with said path of travel of the seed as the seed singulator is rotated about said axis of rotation.

81. The seed singulator assembly according to claim 80 wherein an included angle ranging between about 30° and about 70° is established between the angled seed engaging surface of each seed singulator and the respective side of the seed disc.

82. The seed singulator assembly according to claim 80 wherein each seed singulator defines a mark to indicate visually the orientation of the seed engaging surface relative to the path of travel of the holes in the seed disc.

83. The seed singulator assembly according to claim 79 wherein each seed singulator includes a tubular member with the seed engaging surface of each seed singulator formed as a frusto-conical axial extension of the tubular member.

84. The seed singulator assembly according to claim 83 wherein the frusto-conical extension of the seed engaging surface changes as a function of its circumferential orientation about said axis of rotation.

85. The seed singulator assembly according to claim 83 wherein an outer edge of the frusto-conical extension of each seed singulator has an asymmetrical circumferential configuration such that various portions of the outer edge are disposed at different radial distances from the axis of rotation of the seed singulator.

86. The seed singulator assembly according to claim 85 wherein each seed singulator is mounted for rotation on a hub extending generally normal to the seed disc and secured for movement with a respective bracket, and wherein the seed singulator and hub combination define cooperating instrumentalities therebetween to hold releasably the seed singulator in adjustably fixed relation relative to the hub.

87. The seed singulator assembly according to claim 85 wherein each seed singulator defines a mark to indicate visually the outer edge of the seed engaging surface relative to the path of travel of the holes in the seed disc.

88. The seed singulator assembly according to claim 83 wherein the frusto-conical extension of each seed singulator terminates in an outer edge, and wherein the axis of rotation of each seed singulator is arranged eccentric relative to the outer edge of the extension.

89. The seed singulator assembly according to claim 69 further including a pair of brackets movably mounted on opposite sides of the path of travel of the seeds, each bracket having at least one seed singulator mounted thereon for movement therewith, and wherein each seed singulator is mounted for rotation about a hub extending generally normal to the seed disc, each seed singulator and hub combination having cooperating instrumentalities therebetween to hold releasably the seed singulator in adjustably fixed relation relative to the hub.

90. The seed singulator assembly according to claim 69 wherein each seed singulator is spring biased toward the seed disc such that the seed engaging surface of the seed singulator is disposed proximate to the seed disc during operation of the seed metering mechanism.

* * * * *